United States Patent
Kubota et al.

(10) Patent No.: US 10,524,277 B2
(45) Date of Patent: Dec. 31, 2019

(54) METHOD AND APPARATUS FOR SECONDARY BASE STATION MOBILITY

(71) Applicant: QUALCOMM Incorporated, San Diego, CA (US)

(72) Inventors: Keiichi Kubota, San Diego, CA (US); Gavin Bernard Horn, La Jolla, CA (US); Aziz Gholmieh, Del Mar, CA (US); Soo Bum Lee, San Diego, CA (US); Ozcan Ozturk, San Diego, CA (US); Ajay Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/675,583

(22) Filed: Aug. 11, 2017

(65) Prior Publication Data

US 2018/0049083 A1    Feb. 15, 2018

Related U.S. Application Data

(60) Provisional application No. 62/374,753, filed on Aug. 13, 2016, provisional application No. 62/374,807, (Continued)

(51) Int. Cl.
  *H04W 4/00*   (2018.01)
  *H04W 72/12*  (2009.01)
  (Continued)

(52) U.S. Cl.
  CPC ... *H04W 72/1215* (2013.01); *H04W 36/0055* (2013.01); *H04W 36/04* (2013.01);
  (Continued)

(58) Field of Classification Search
  USPC .................... 370/329, 338, 328, 331; 1/1
  See application file for complete search history.

(56) References Cited

U.S. PATENT DOCUMENTS

2014/0241317 A1  8/2014  Jamadagni et al.
2014/0286243 A1  9/2014  Yamada
(Continued)

FOREIGN PATENT DOCUMENTS

EP  2947951 A1  11/2015
WO  2015009075 A1  1/2015

OTHER PUBLICATIONS

ETRI: "Analysis of Signalling Impacts by Routing Options", 3GPP Draft; R2-133170, 3rd Generation Partnership Project (3GPP), vol. RAN WG2, No. Ljubljana, Slovenia; Sep. 27, 2013, XP050718901, Retrieved from the Internet: URL:http://www.3gpp.org/ftp/tsg_ran/WG2_RL2/TSGR2_83bis/Docs/ [retrieved on Sep. 27, 2013), 8 pages.

(Continued)

*Primary Examiner* — David Q Nguyen
(74) *Attorney, Agent, or Firm* — Arent Fox LLP

(57) ABSTRACT

The apparatus for wireless communication includes a processing system. The processing system is configured to establish a first radio link with a master base station, establish a second radio link with a first cell associated with a secondary base station, wherein the second radio link comprises a SRB, and receiving a RRC connection reconfiguration signal from the second radio link SRB to establish the second radio link with a second cell.

30 Claims, 24 Drawing Sheets

Related U.S. Application Data filed on Aug. 13, 2016, provisional application No. 62/374,797, filed on Aug. 13, 2016.

(51) Int. Cl.
| | |
|---|---|
| *H04W 74/08* | (2009.01) |
| *H04W 76/15* | (2018.01) |
| *H04W 76/27* | (2018.01) |
| *H04W 36/04* | (2009.01) |
| *H04W 36/08* | (2009.01) |
| *H04W 36/32* | (2009.01) |
| *H04W 36/00* | (2009.01) |
| *H04W 88/02* | (2009.01) |
| *H04W 88/08* | (2009.01) |

(52) U.S. Cl.
CPC ........... *H04W 36/08* (2013.01); *H04W 36/32* (2013.01); *H04W 72/1268* (2013.01); *H04W 72/1284* (2013.01); *H04W 74/0833* (2013.01); *H04W 76/15* (2018.02); *H04W 76/27* (2018.02); *H04W 36/0072* (2013.01); *H04W 88/02* (2013.01); *H04W 88/08* (2013.01)

(56) References Cited

U.S. PATENT DOCUMENTS

| | | | |
|---|---|---|---|
| 2015/0312810 A1* | 10/2015 | Yasuda | H04W 36/08 370/338 |
| 2016/0044548 A1 | 2/2016 | Choi et al. | |
| 2016/0044735 A1 | 2/2016 | Ohta et al. | |
| 2016/0066237 A1* | 3/2016 | Kato | H04L 1/16 370/331 |
| 2016/0142951 A1* | 5/2016 | Balasubramanian | H04W 36/023 370/331 |
| 2016/0157164 A1* | 6/2016 | Lee | H04W 76/27 370/329 |
| 2016/0174124 A1 | 6/2016 | Basu et al. | |
| 2016/0219475 A1* | 7/2016 | Kim | H04L 5/00 |
| 2016/0227459 A1* | 8/2016 | Fujishiro | H04W 16/32 |
| 2016/0255593 A1 | 9/2016 | Blankenship et al. | |
| 2016/0302075 A1* | 10/2016 | Dudda | H04W 12/10 |
| 2016/0316508 A1 | 10/2016 | Hong et al. | |
| 2016/0353511 A1* | 12/2016 | Gunnarsson | H04W 36/023 |
| 2017/0111841 A1 | 4/2017 | Henttonen et al. | |
| 2017/0347270 A1 | 11/2017 | Iouchi et al. | |
| 2018/0020444 A1 | 1/2018 | Lee et al. | |
| 2018/0035339 A1 | 2/2018 | Mitsui et al. | |
| 2018/0049214 A1 | 2/2018 | Kubota et al. | |
| 2018/0049224 A1 | 2/2018 | Dinan et al. | |

OTHER PUBLICATIONS

ETRI: "Discussion on Secondary Cell Change Procedure", 3GPP DRAFT; R2-134006, 3rd Generation Partnership Project (3GPP), vol. RAN WG2, No. San Francisco, USA; Nov. 13, 2013, XP050736814, Retrieved from the Internet: URL:http://www.3gpp.org/ftp/Meetings_3GPP_SYNC/RAN/RAN2/Docs/ [retrieved on Nov. 13, 2013], 4 pages.

International Search Report and Written Opinion—PCT/US2017/046653—ISA/EPO—dated Oct. 20, 2017.

\* cited by examiner

METHOD AND APPARATUS FOR SECONDARY BASE STATION MOBILITY

CROSS-REFERENCE TO RELATED APPLICATION(S)

This application claims the benefit of U.S. Provisional Application Ser. No. 62/374,753, entitled "Capability Coordination across RATs" and filed on Aug. 13, 2016, U.S. Provisional Application Ser. No. 62/374,807, entitled "Method and Apparatus of S-NB Mobility for NR" and filed on Aug. 13, 2016, and U.S. Provisional Application Ser. No. 62/374,797, entitled "Capability Coordination across RATs" and filed on Aug. 13, 2016, each of which is expressly incorporated by reference herein in their entirety.

BACKGROUND

Field

The present disclosure relates generally to communication systems, and more particularly, to signaling for dual connectivity.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some communication systems may support dual connectivity, such as a user equipment (UE) that may connect to two base stations, e.g., a master base station and a secondary base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed above, some communication systems may support dual connectivity, such as a UE that may connect to two base stations, e.g., a master base station and a secondary base station. The systems and methods described herein may be used to support dual connectivity where a secondary base station performs radio resource manager (RRM).

In an aspect of the disclosure, a method, a computer-readable medium, and an apparatus are provided. The apparatus may be an apparatus for wireless communication. For example, the apparatus may be a secondary base station configured to establish a radio link with a UE as a secondary base station for dual connectivity, wherein the radio link comprises a signaling radio bearer (SRB), determine at least one of a cell change or a change of sequence number (SN) at the secondary base station, transmit a handover request in response to the determination, receiving a handover request acknowledge, and transmitting a radio resource control (RRC) connection reconfiguration based on the handover request acknowledge via the SRB.

In an aspect of the disclosure, a method, a computer-readable medium, and an apparatus are provided. The apparatus may be an apparatus for wireless communication. For example, the apparatus may be configured to establish a first radio link with a master base station, establish a second radio link with a first cell associated with a secondary base station, wherein the second radio link comprises a signaling radio bearer (SRB), and receiving a radio resource control (RRC) connection reconfiguration signal from the second radio link SRB to establish the second radio link with a second cell.

In an aspect of the disclosure, a method, a computer-readable medium, and an apparatus are provided. The apparatus may be an apparatus for wireless communication. For example, the apparatus may be a secondary base station configured to transmit a handover request acknowledge, receive a radio resource control (RRC) reconfiguration complete, and transmit a secondary base station change complete.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
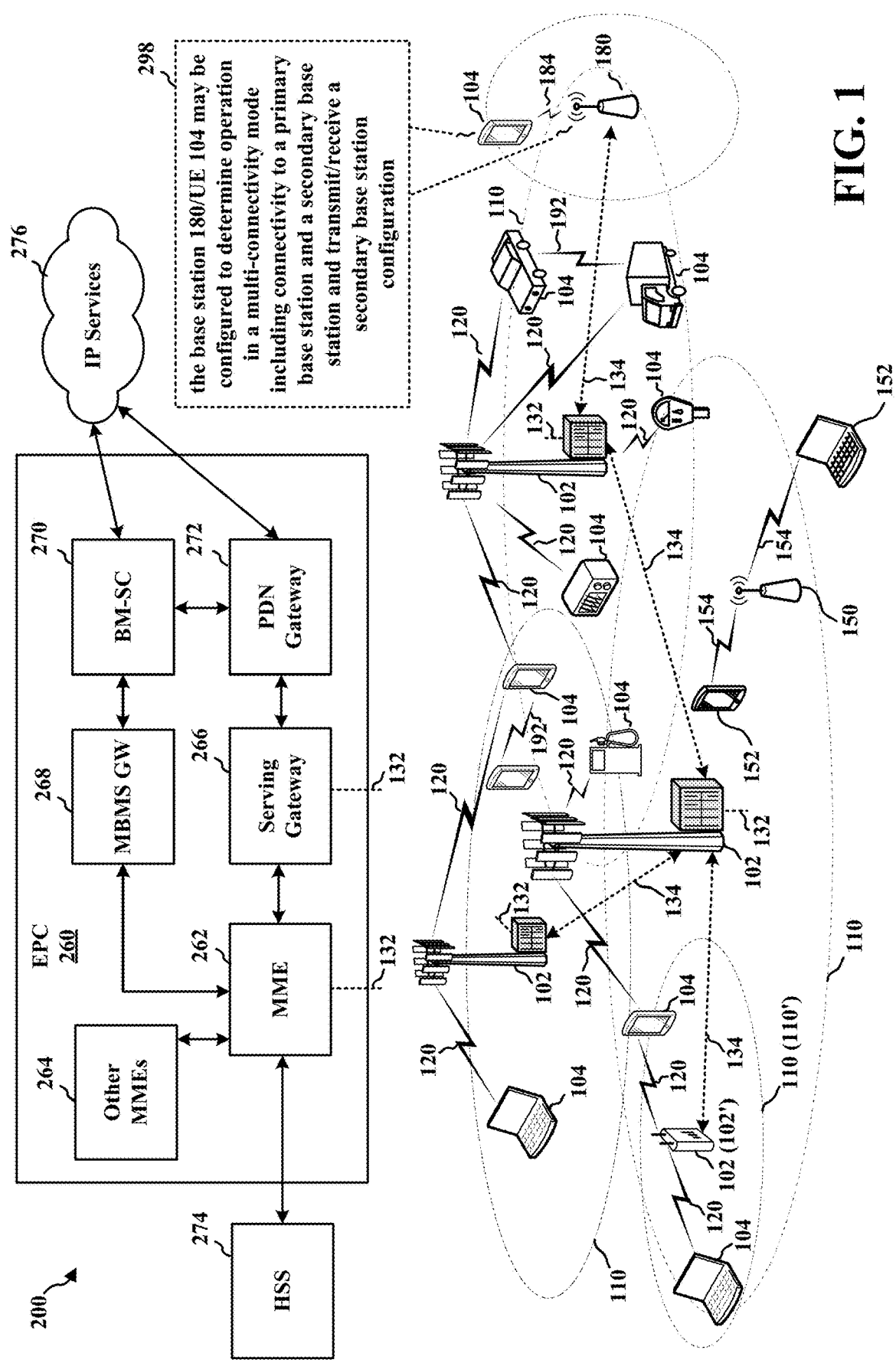
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to, and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180/UE 104 may be configured to determine operation in a multi-connectivity mode including connectivity to a primary base station and a secondary base station and transmit/receive a secondary base station configuration (198). The base station 180 may transmit the secondary base station configuration and the UE 104 may receive the secondary base station configuration. The base station 180 may be the primary base station or the secondary base station.

Figure 2:
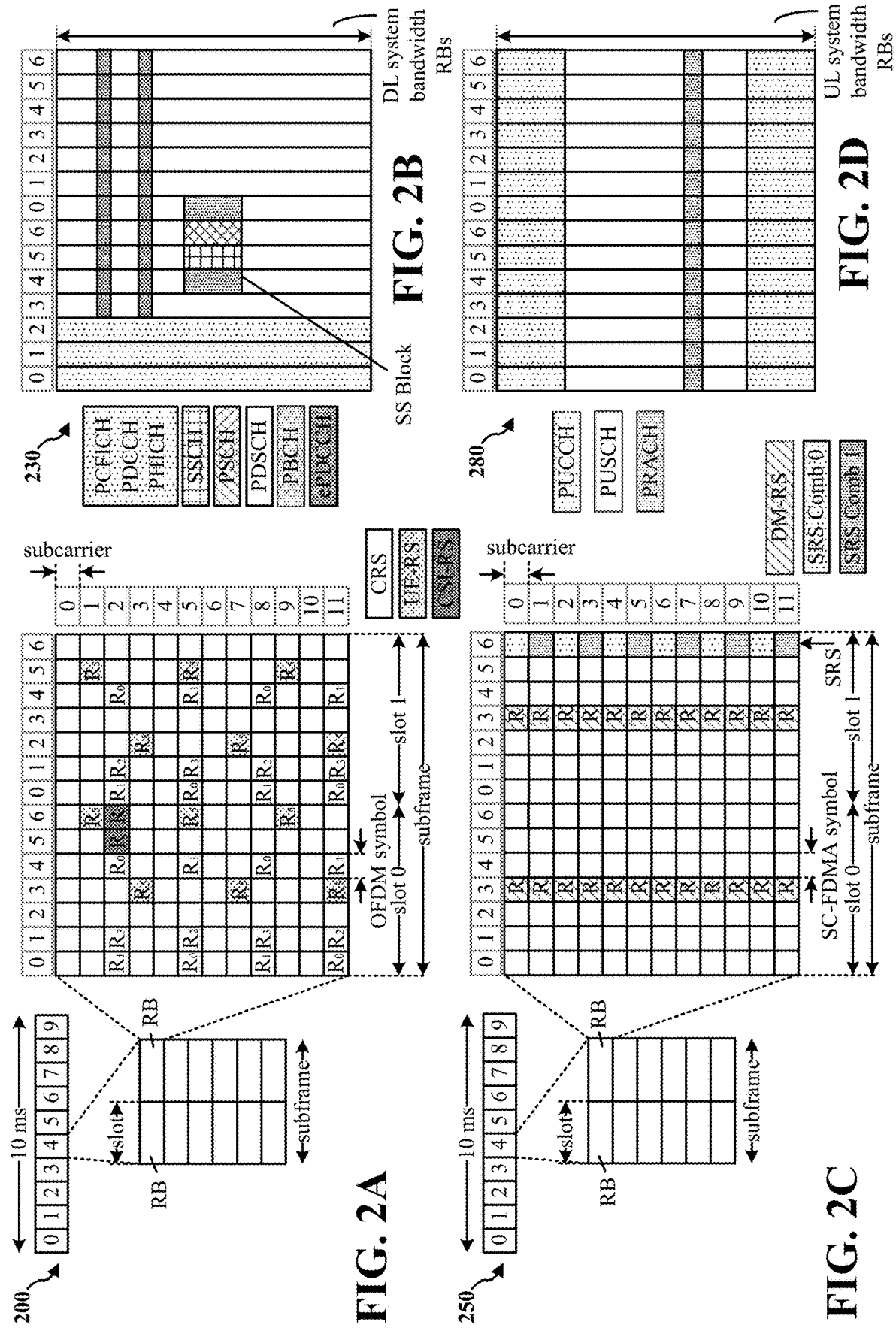
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
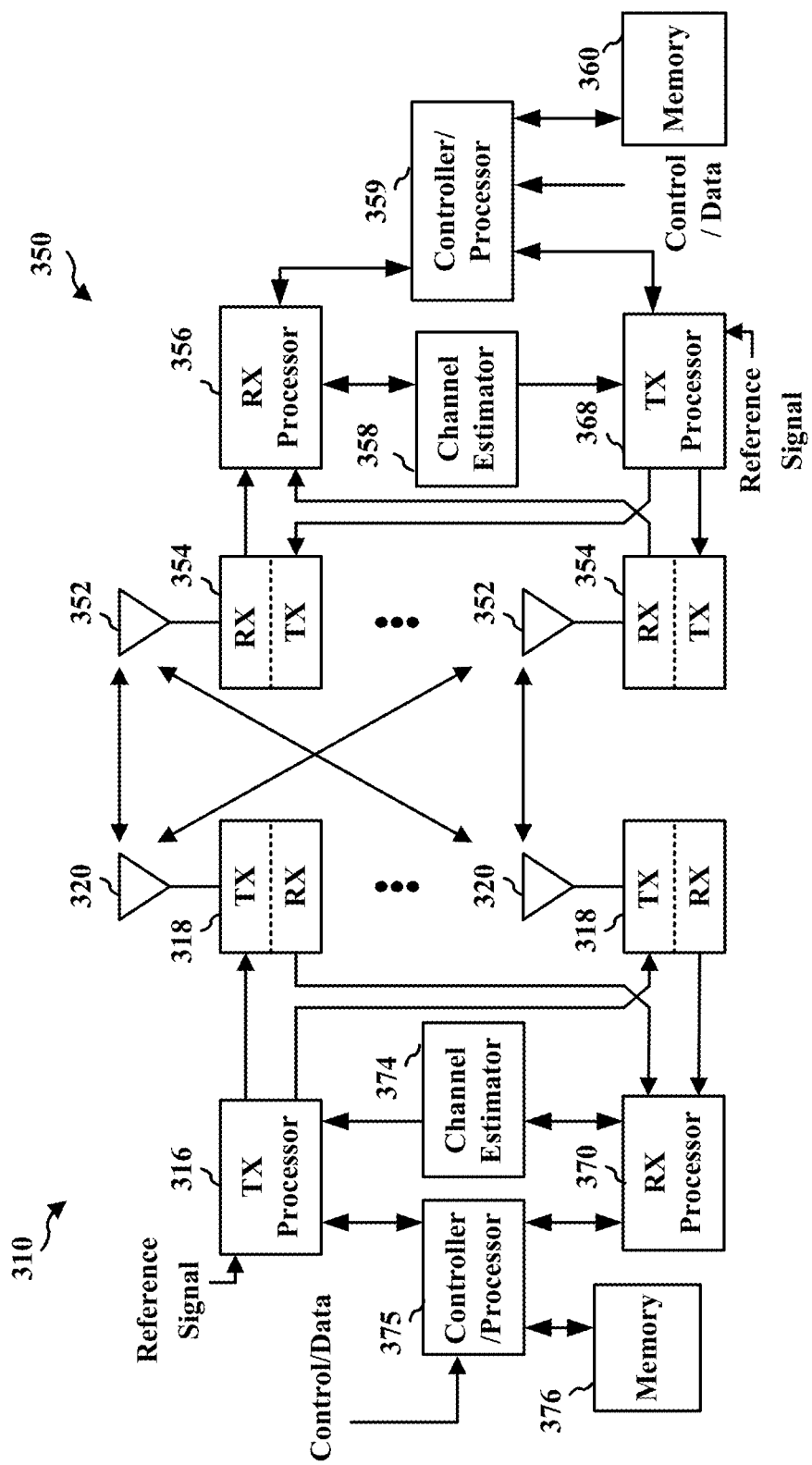
FIG. 3 is a diagram illustrating an example of a base station and user equipment in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal-processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
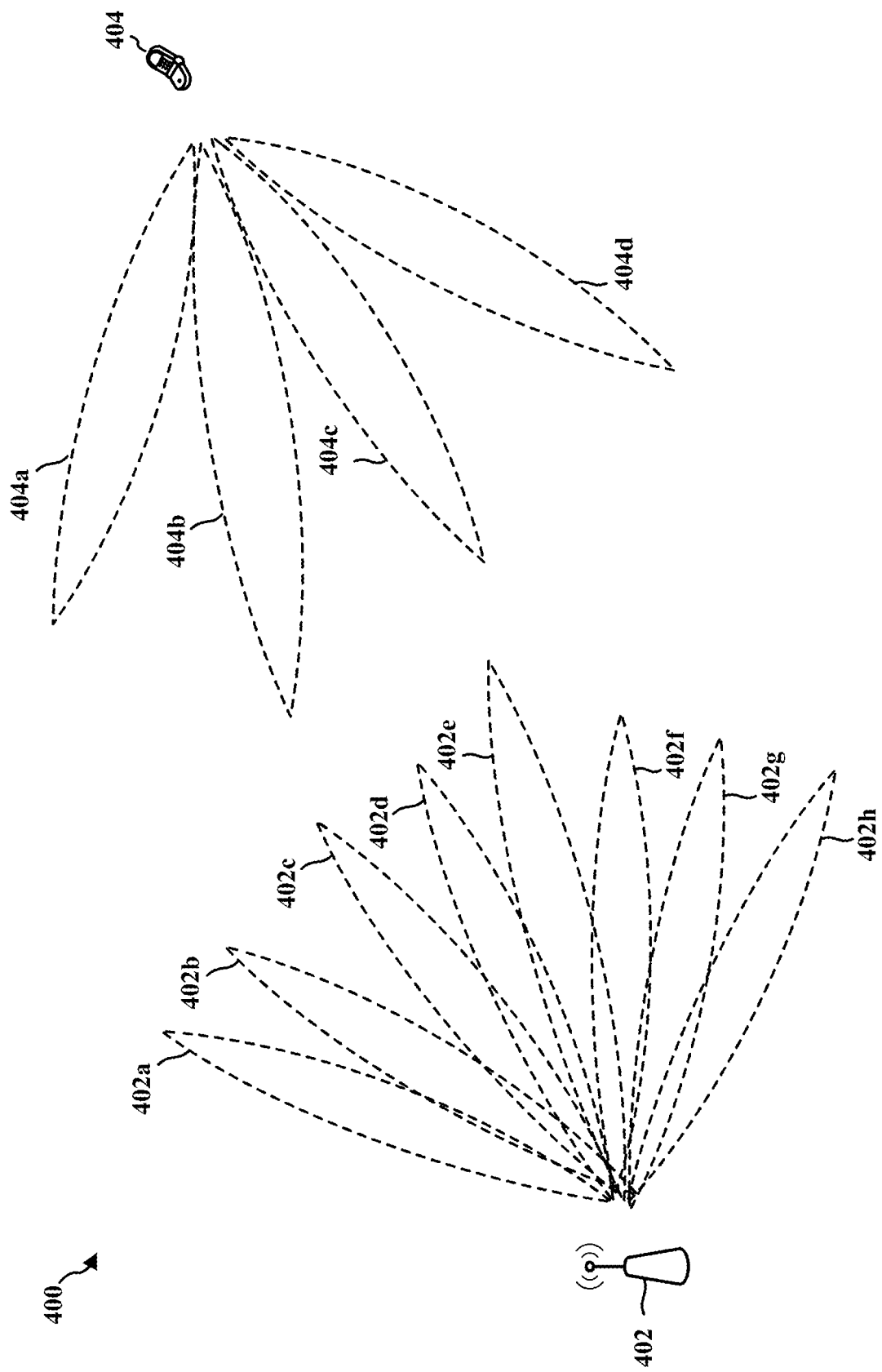
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
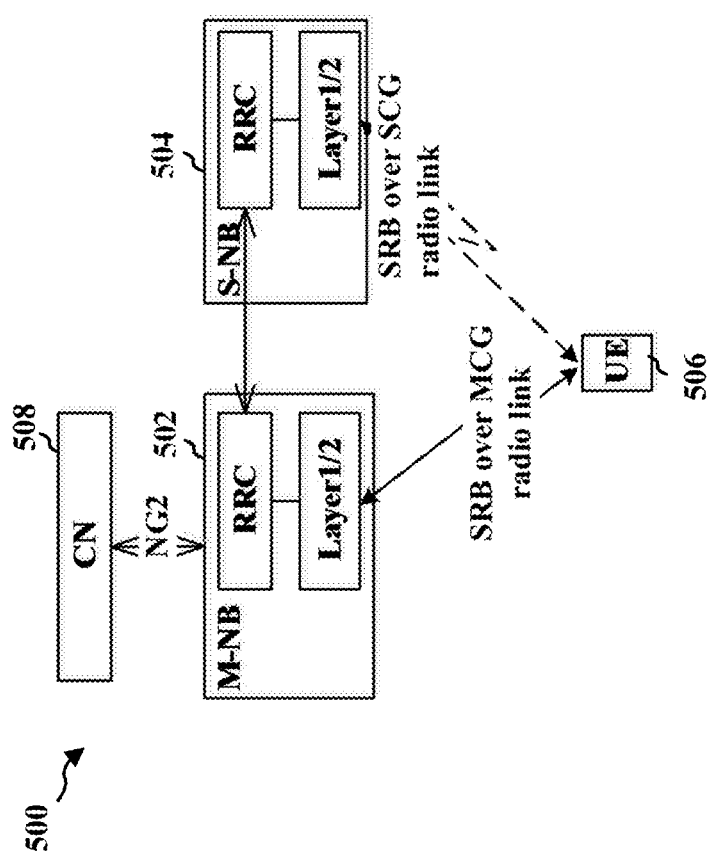
FIG. 5 is a diagram illustrating non-standalone NR signaling including RAN logical architecture of NR multi-connectivity.

FIG. 5 is a diagram 500 illustrating non-standalone (NSA) NR signaling including RAN logical architecture of NR multi-connectivity. The diagram 500 includes two base stations 502, 504 and a UE 506. The base station 502 may be a master base station 502 such as a master node B (M-NB). The base station 504 may be a secondary or secondary base station 504 such as a secondary or secondary node B (S-NB).

The master base station 502 may be coupled to the secondary or secondary base station 504 allowing communications between the master base station 502 and the secondary or secondary base station 504. For example, the RRC in the master base station 502 may be coupled to the RRC in the secondary or secondary base station 504.

The diagram 500 also includes a core network (CN) 508. The CN 508 may be coupled to the master base station 502. Accordingly, the master base station 502 may provide a connection to the CN, e.g., over the NG2. Additionally, the secondary or secondary base station 502 may provide a connection to the CN, e.g., through the RRC in the secondary or secondary base station 504 to the RRC in the master base station 502 and over the NG2 between the master base station 502 and the CN 508. Accordingly, the UE 506 may communicate with the CN 508 through one or more of the master base station 502 and/or the secondary or secondary base station 504. For example, the UE 506 may operate in a dual connectivity operation to communicate with the CN 508 through both the master base station 502 and the secondary or secondary base station 504.

Dual connectivity operation may be used in a communication system such as a 3GPP based communication system. For example, the UE 506 may maintain simultaneous connections to a macro cell base station (MeNB) and a small cell base station (SeNB). Dual connectivity is defined in TS 36.300, for example.

An aspect may consider multi-connectivity (equivalent to dual connectivity in LTE) where one of the cells is LTE (e.g., the MeNB) and the other cell is 5G-NR (e.g., the SeNB). Different aspects may vary the device that maintains a radio resource manager (RRM) configuration of a secondary base station, e.g., a secondary node B (S-NB). In an aspect of the systems and methods described herein, mobility may be supported using the secondary base station to perform RRM.

Some examples may include one or more of three options to deliver the secondary base station configuration to a UE. A first option may use secondary base station radio resource control (RRC) over a master cell group (MCG). In an aspect that sends a secondary base station RRC over a MCG a secondary base station such as a secondary node B's first access service network (ASN.1) may always be sent over an MCG radio link. In this aspect, the secondary base station ASN.1 may be a secondary base station information element (IE) "S-NB configuration IE" and the IE may be piggybacked via an SCG-Config IE in M-NB's RRC message: RRCConnectionReconfiguration.

In a second option, a secondary base station connection may be established over MCG with a secondary base station RRC for the initial S-NB connection setup. The secondary base station RRC for the initial S-NB connection setup may be sent over an MCG radio link. The subsequent NR RRC messages may be sent over NR Uu.

In a third option, a secondary base station RRC may be sent over a split signaling radio bearer (SRB). A UE 506 and a radio access network (RAN) may establish an SRB per secondary base station, e.g., Node-B (NB) and the secondary base station RRC messages may be delivered over the split SRB either by MCG SRB, or SCG SRB.

Aspects may be related to secondary base station mobility. In an aspect, on a network side, a method for mobile network nodes to support multi-connectivity with different radio access technologies (RATs) for a mobile device may include at each radio access network node (RAN node), maintaining the mobile device's capabilities for the RAT associated with the RAN node, determining the radio resource allocation for the mobile device based on the mobile device's capability information for the associated RAT, requesting an anchor RAN node to derive a new security key (S-K*$_{NB}$) and provide the derived key and a corresponding SCG count used for the key derivation so that the secondary RAN node enforces the security towards the established radio bearers, and notifying the anchor RAN node of the secondary RAN node's address so that the anchor RAN node can request the CN node to update the user plane path accordingly.

In an aspect, a method for mobile network nodes to update multi-connectivity configuration with different radio access technologies (RATs) for a mobile device comprising at each radio access network node (RAN node) may include updating the mobile device's capabilities for the RAT associated with the RAN node upon reception UE capability information sent from the mobile device and determining the radio resource reallocation for the mobile device based on the updated UE capability information (i.e. reducing or increasing number of serving cells for the mobile device).

In an aspect, the anchor RAN node and the secondary RAN node may be associated with LTE eNB, NR NB or WLAN WT with any combination thereof (e.g. LTE eNB+ NR NB, NR-NB+LTE eNB, LTE eNB+LTE eNB, NR NB+NR NB, LTE eNB+WLAN WT, NR-NB+WLAN WT and so on). The anchor RAN node and the secondary RAN node may be associated with the LTE eNB, NR NB, WLAN, or the other RAT such as GSM, WCDMA, HSPA, WiMax with any combination thereof. The multi-connectivity may include two or more connections with any combination of RATs (LTE, NR, WLAN or even+WCDMA/HSPA, GSM). Reconfiguring the mobile device may be performed by using either M-NB's radio link (MCG radio link), S-NB's radio link (SCG radio link) or any combination thereof.

In an aspect, on a UE side, a method for mobile device to support multi-connectivity with different radio access technologies (RATs) may include reporting the mobile device's UE capability information per RAT and reporting the mobile device's capability information when the one of the UE capabilities is changed due to the reconfiguration of the other RAT's connection (e.g., NR RF capability is updated upon LTE SCell addition or vice-versa).

In an aspect, splitting the mobile device's overall capabilities across supported RATs may be based on user preference (e.g. NR capabilities are prioritized over the other RAT so more capabilities are assigned for NR). In an aspect, reorganizing the UE capability information per RAT upon change of each RAT's connection may be based on the user preference. In an aspect, reporting the UE capability information may be performed by using either M-NB's radio link (MCG radio link), S-NB's radio link (SCG radio link) or any combination thereof. In an aspect, reconfiguring the mobile device may be performed by using either M-NB's radio link (MCG radio link), S-NB's radio link (SCG radio link) or any combination thereof.

Aspects may be related to the concept of dual connectivity operation. The systems and methods described herein may considers multi-connectivity (equivalent to dual connectivity in LTE), where one of the cells is LTE (the MeNB) and the other cell is NR (the S-NB).

In various aspects, who maintains RRM configuration of S-NB is considered. The RAN may maintain the RRM configuration of the UE and may, e.g. based on received measurement reports or traffic conditions or bearer types, decide to ask a Secondary NB (S-NB) to provide additional resources (serving cells) for the UE. Options for the secondary base station RRM may include (1) master NB (M-NB) performs RRM of the S-NB in coordination with the S-NB and (2) secondary NB (S-NB) performs RRM at the S-NB. Table 1 compares the positive aspects and the negative aspects of each option assuming LTE as the master base station and NR as the secondary base station.

TABLE 1

Comparison table of RRM for S-NB at M-NB or S-NB

| Option | Positive | Negative |
| --- | --- | --- |
| LTE Master NB (M-NB) performs RRM of the S-NB in coordination with the S-NB | M-NB can coordinate the configuration to not exceed the overall UE capability | Significant more complexity in the LTE eNB to understand the NR mobility and configuration procedures |
| Secondary NB (S-NB) performs RRM at the S-NB | Minimizes impact to legacy LTE because LTE just needs to be involved in the initial NR connection establishment Adaptive to any of the NR RAN architecture options Mobility management in each RAT becomes independent, i.e., LTE does not need to support the NR mobility procedures (note that this is similar to what is done in LTE for LWA) Capabilities remain RAT independent, i.e., LTE does not need to understand NR capabilities and vice versa NR C-plane activities won't interrupt M-NB so each RAT can work completely independently once NR connection is established, e.g., NR does not need to rely on higher latency LTE air interface to manage its mobility in challenging conditions of mmW | How to ensure the configuration does not exceed the overall UE capability |

In LTE-WLAN aggregation (LWA) (ref 3GPP 36.300 clause 22A), the WLAN can maintain its own mobility and the UE can move among WLAN APs under the same WLAN termination (WT). As long as the UE is associated with of one of the APs for the WT, the LTE forwards the packets to the WT and the WT is responsible for forwarding the data to the appropriate AP. If the UE moves out of coverage from one WT to another, the UE performs the LWA WT release procedure and LWA WT addition procedure to reestablish LWA. As such, there is no procedure defined for mobility in LWA that allows the UE to move from one WT to another without releasing the old WT and establishing LWA at the new WT. The invention determines how to perform mobility in these scenarios and also applies to the scenario where the secondary NB (S-NB) is another RAT such as NR.

Figure 6:
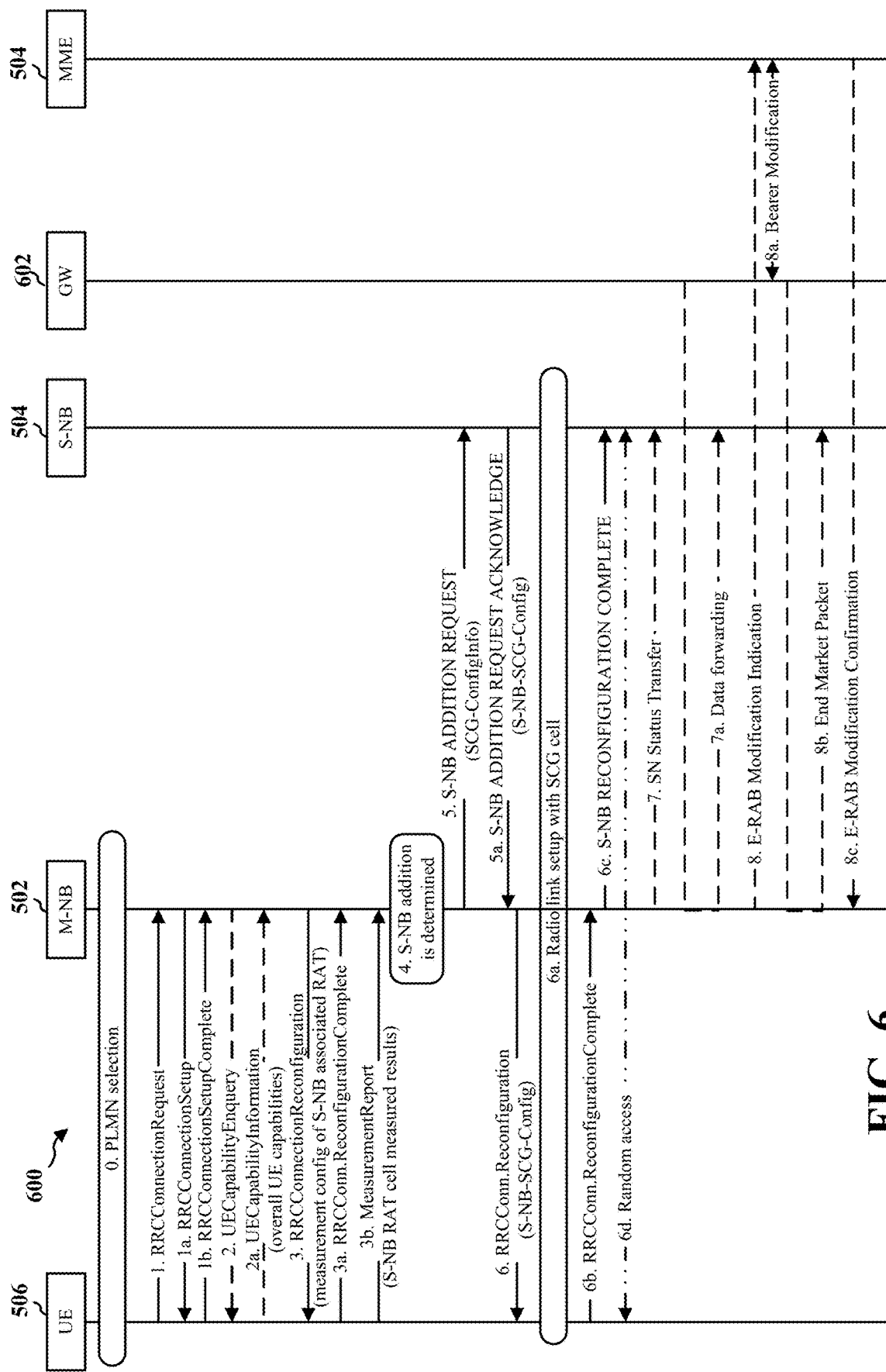
FIG. 6 is a diagram illustrating a secondary base station connection setup call-flow.

FIG. 6 is a diagram 600 illustrating a secondary base station connection setup call-flow. The diagram 600 includes data flows between a UE 506, master base station (M-NB) 502, secondary base station 504, GW 602, and MME 604. In a first option, a NR connection setup may be used. The diagram 600 illustrates option 1, S-NB RRC over MCG. Option 1 may use the principles as Release 12 LTE DC operation to provide a reliable connection used for the secondary base station 504 (S-NB) RRC signaling. Option 1 may perform better, when, for example, NR is deployed on mmW frequencies. The following steps illustrated an example call-flow of secondary base station 504 (S-NB) connection setup and secondary base station 504 (S-NB) change scenarios.

In an aspect, a RAB establishment procedure and security mode command procedure may take place after step 1, however, to simplify the diagram 600, the RAB establishment procedure and the security mode command procedure are omitted in the call-flow.

At step 0, the UE 506 performs a PLMN search and camps on a master base station 502 (M-NB) associated RAT cell.

At step 1, the UE 506 establishes an RRC connection with the master base station 502 (M-NB). Establishing the RRC connection with the master base station 502 (M-NB) may include the RRC connection request from the UE 506 to the master base station 502 (step 1), an RRC connection setup message from the master base station 502 to the UE 605 (step 1a), and an RRC connection setup complete message from the UE 506 to the master base station 502 (step 1b).

At step 2, (optional), the master base station 502 (M-NB) requests the UE to report the UE capability (step 2), e.g., when the master base station 502 (M-NB) fails to obtain the UE capability for the UE 506 from a core network entity (e.g. MME). UE 506 reports overall UE capability information including supported RATs' capabilities to the master base station 502 (M-NB) (step 2a).

At step 3, the master base station 502 (M-NB) configures the UE 506 with the measurement configuration of the secondary base station 504 (S-NB) associated RAT (S-NB RAT) and then the UE 506 starts the secondary base station 504 (S-NB) RAT measurements accordingly. The UE 506 sends an RRC connection reconfiguration complete (step 3a) and a measurement report message to the master base station 503 (step 3b) including the measured results of the detected cell(s) when certain reporting criteria are met.

At step 4, the master base station (M-NB) decides to add a secondary connection with the secondary base station 504 (S-NB) associated with the reported S-NB RAT cell based on e.g. the measured results of the cell(s) and the remaining capacities at the master base station 502 (M-NB) and/or the secondary base station 504 (S-NB).

At step, 5, the master base station 502 (M-NB) requests that the secondary base station 504 (S-NB) allocate radio resources for a specific E-RAB, indicating E-RAB characteristics (E-RAB parameters, TNL address information corresponding to bearer type). In addition, the master base station 502 (M-NB) indicates within SCG-ConfigInfo the UE capabilities of the secondary base station 504 (S-NB) associated RAT used as basis for the reconfiguration by the secondary base station 504 (S-NB), but does not include SCG configuration. Furthermore, the master base station 502 (M-NB) indicates within SCG-ConfigInfo the security key S-K*$_{NB}$ for secondary base station 504 (S-NB) security enforcement as well as the corresponding SCG Count used for the key derivation.

The master base station 502 (M-NB) may provide the latest measurement results for the SCG cell(s) requested to be added. The secondary base station 504 (S-NB) may reject the request (step 5a).

When the RRM entity in the secondary base station 504 (S-NB) is able to admit the resource request, it allocates respective radio resources and, dependent on the bearer option, respective transport network resources.

The FFS, maybe optional. The secondary base station 504 (S-NB) may trigger random access so that synchronisation of the secondary base station 504 (S-NB) radio resource configuration can be performed.)

The secondary base station 504 (S-NB) provides the new radio resource of SCG in SCG-Config to the master base station 502 (M-NB). For SCG bearers, the secondary base station 504 (S-NB) provides the new radio resource of the SCG together with NG3 DL TNL address information for the respective E-RAB and security algorithm, for split bearers together with XN/X2DL TNL address information.

In contrast to SCG bearer, for the split bearer option the master base station 502 (M-NB) may either decide to request resources from the secondary base station 504 (S-NB) of such an amount, that the QoS for the respective E-RAB is guaranteed by the exact sum of resources provided by the master base station 502 (M-NB) and the secondary base station 504 (S-NB) together, or even more. The NBs decision may be reflected in step 5 by the E-RAB parameters signalled to the secondary base station 504 (S-NB), which may differ from E-RAB parameters received over S1/NG2.

For a specific E-RAB, the master base station 502 (M-NB) may request the direct establishment of an SCG or a split bearer, e.g., without first having to establish an MCG bearer.

In a case of MCG split bearers, transmission of user plane data may take place after step 5a. In case of SCG bearers or SCG split bearers, data forwarding and the SN Status Transfer may take place after step 5a.

At step 6, the master base station 502 (M-NB) sends the RRCConnectionReconfiguration message to the UE 506 including the new radio resource configuration of SCG according to the SCG-Config. The UE 506 applies the new configuration and replies to the master base station 502 (M-NB) with an RRCConnectionReconfigurationComplete message (step 6b). In case the UE 506 is unable to comply with (part of) the configuration included in the RRCConnectionReconfiguration message, the UE 506 may perform the reconfiguration failure procedure. The master base station 502 (M-NB) informs the secondary base station 504 (S-NB) that the UE 506 has completed the reconfiguration procedure successfully (step 6c). The FFS maybe optional (step 6d). The UE 506 performs synchronisation towards the PSCell of the secondary base station 504 (S-NB). The order the UE 506 sends the RRCConnectionReconfigurationComplete message and performs the Random Access procedure towards the SCG is not defined. The successful RA procedure towards the SCG is not required for a successful completion of the RRC Connection Reconfiguration procedure.

At step 7, in case of SCG bearers or SCG split bearers, and dependent on the bearer characteristics of the respective E-RAB, the master base station 502 (M-NB) may take actions to minimise service interruption due to activation of dual connectivity, e.g., SN status transfer (step 7), data forwarding (step 7a).

At step 8, for SCG bearers, the update of the UP path towards the EPC is performed. At step 8, the master base station 502 sends an E-RAB Modification Indication to the MME 604. At step 8a, the MME 604 sends a bearer modification message to the GW 602 (step 8b). The GW 602 sends an end market packet to the secondary base station 504 routed through the master base station 502 (step 8b). The MME 604 confirms the RAB modification (step 8c).

Figure 7:
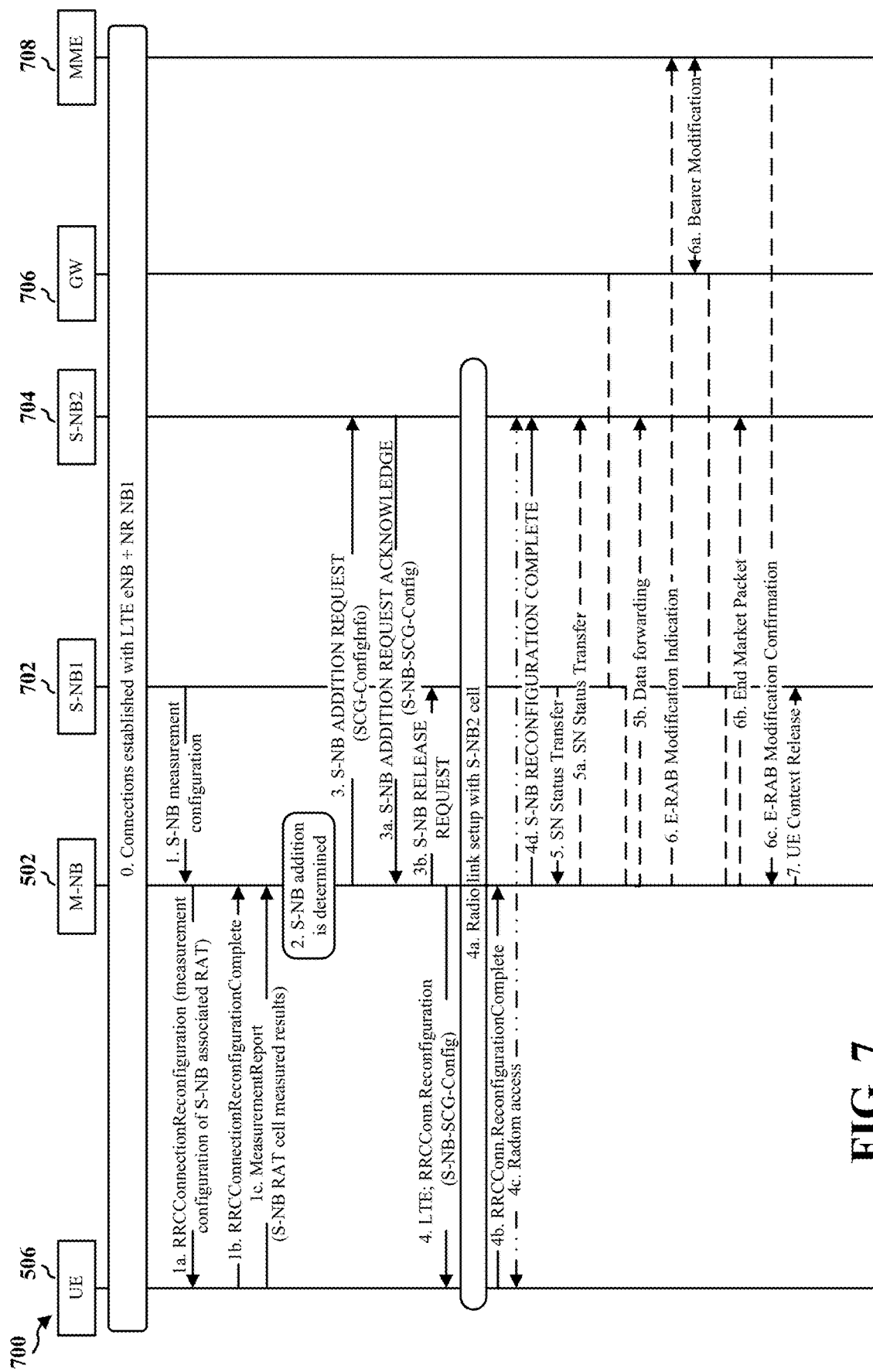
FIG. 7 is a diagram illustrating a change of secondary base station call-flow.

FIG. 7 is a diagram 700 illustrating a change of secondary base station 504 call-flow. The diagram 700 includes a master base station 502, a UE 506, and a pair of secondary base stations 702, 704. The diagram also includes a GW 706 and an MME 708.

At step 0, the UE 506 and the network establish dual connectivity connections with the master base station 502 (M-NB) and the secondary base station 702 (S-NB1).

At step 1, the secondary base station 702 (S-NB1) requests the master base station 502 (M-NB) to configure the UE 506 with the measurement configuration of a secondary base station (S-NB), e.g., secondary base station 702 (S-NB1) (step 1) associated RAT (S-NB RAT). Accordingly, the master base station 502 (M-NB) reconfigures the UE 506 with the secondary base station 504 (S-NB) RAT measurement, e.g., of the secondary base station 702 (step 1a). The UE 506 performs the measurement and sends a measurement report message including the secondary base station 504 (S-NB) RAT cell's measured results when certain reporting criteria are met (step 1c).

At step 2, the master base station 502 (M-NB) determines the change of secondary base station based on e.g. the measured results of the secondary base station 504 (S-NB) RAT and the remaining capacities at the S-NB1 and/or the S-NB2.

At step 3, the master base station 502 (M-NB) initiates the change of S-NB by requesting the target S-NB, secondary base station 704 (S-NB2), to allocate resources for the UE 506 by means of the S-NB addition preparation procedure (additional request). The master base station 502 (M-NB) includes the SCG configuration of the old S-NB (S-NB1) as well as the S-NB associated RAT UE capabilities in the S-NB addition request (step 3). The target S-NB, secondary base station 704 (S-NB2) may acknowledge (step 3a).

When forwarding is needed, the target secondary base station 704 (S-NB2) provides forwarding addresses to the master base station 502 (M-NB). Furthermore, the master base station 502 (M-NB) indicates within SCG-ConfigInfo the security key $S\text{-}K^*_{NB}$ for the target S-NB security enforcement as well as the corresponding SCG Count used for the key derivation (step 3b). When the allocation of target secondary base station 704 (S-NB2) resources was successful, the master base station 502 (M-NB) initiates the release of the source S-NB resources towards the UE 506 and the source secondary base station (S-NB) (step 3b). When data forwarding is needed the master base station 502 (M-NB) provides data forwarding addresses to the source secondary base station 702 (S-NB1). Either direct data forwarding or indirect data forwarding is used for SCG bearer. Only indirect data forwarding is used for Split bearer. Reception of the S-NB Release Request message triggers the source S-NB to stop providing user data to the UE 506 and, if applicable, to start data forwarding.

At step 4, the master base station 502 (M-NB) triggers the UE 506 to apply the new configuration. The master base station 502 (M-NB) indicates the new configuration in the RRCConnectionReconfiguration message towards the UE 506 (step 4). In case the UE 506 is unable to comply with (part of) the configuration included in the RRCConnectionReconfiguration message, the UE 506 performs the reconfiguration failure procedure (step 4c). FFS, maybe optional (The UE 506 synchronizes to the target S-NB (step 4d). If the RRC connection reconfiguration procedure was successful, the master base station 502 (M-NB) informs the target S-NB using an RRC configuration complete message (step 4b).

At step 5, when applicable, data forwarding from the source secondary base station (S-NB) takes place. Data forwarding may be initiated as early as the source S-NB receives the S-NB Release Request message from the master base station 502 (M-NB).

At step 6, when one of the bearer contexts was configured with the SCG bearer option at the source S-NB, path update is triggered by the master base station 502. The master base station 502 may transmit an e-RAB modification to the MME 708 (step 6) and an end market packet to the secondary base station 704 (step 6b). The MME 708 may respond to the master base station 502 with a confirmation (step 6c).

At step 7, upon reception of the UE Context Release message, the source secondary base station (S-NB) can release radio and C-plane related resource associated to the UE context. For example, the master base station may transmit a UE context release to the secondary base station 704 (S-NB1). Any ongoing data forwarding may continue.

Figure 8:
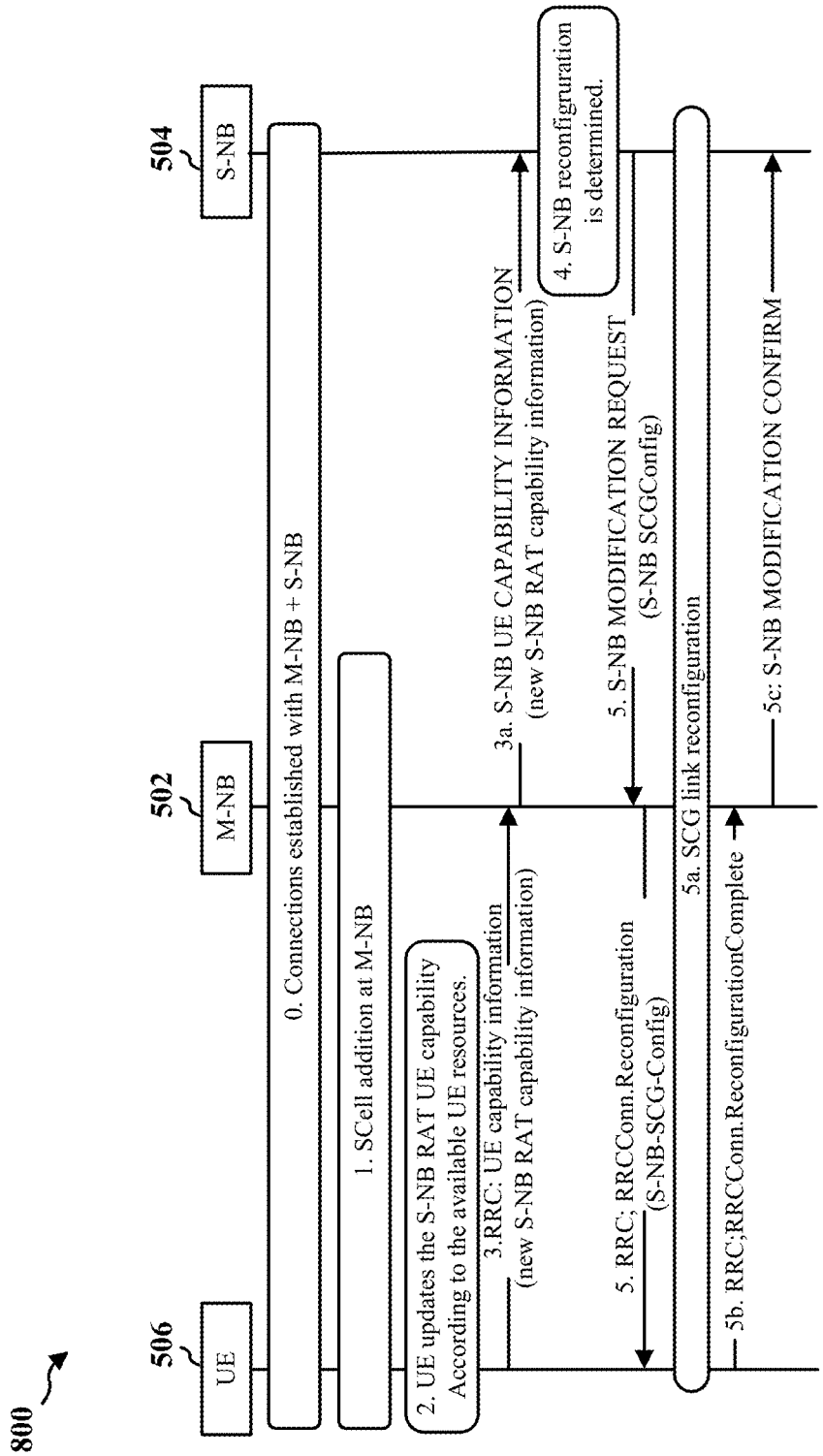
FIG. 8 is a diagram illustrating a secondary base station S-NB connection reconfiguration procedure upon UE capability update.

FIG. 8 is a diagram 800 illustrating a secondary base station 504 (S-NB) connection reconfiguration procedure upon UE capability update. The diagram 800 includes a master base station 502 (M-NB), a secondary base station 504 (S-NB), and the UE 506.

At step 0, the UE 506 and RAN establish connections with the master base station 502 (M-NB) and the secondary base station 504 (S-NB).

At step 1, the master base station 502 (M-NB) determines a SCell addition and reconfigures the UE 506 with the new CA configuration.

At step 2, the UE 506 updates the other RAT's UE capability information based on the remaining UE's resources (e.g. available RF chains).

At step 3, the UE 506 reports the updated UE capability information to the secondary base station 504 (S-NB), e.g., through the master base station 502 (M-NB) (steps 3, 3a).

At step 4, the secondary base station 504 (S-NB) reallocates the resources for the UE 506 based on the updated UE capability information and determines to reconfigure the UE 506 accordingly.

At step 5, the secondary base station 504 (S-NB) triggers the reconfiguration of the SCG link by sending a S-NB MODIFICATION REQUEST message including a new SCG configuration to the master base station 502 (M-NB) (step 5 from S-NB to M-NB). The master base station 502 (M-NB) forwards the S-NB MODIFICATION REQUEST message including a new SCG configuration to the UE 506 (step 5 from M-NB to UE). The UE 506 performs the commanded reconfiguration (step 5a) and sends back a response message after the reconfiguration (step 5b), e.g., RRC Connection ReconfigurationComplete. The master base station 502 (M-NB) confirms the successful completion of the reconfiguration by sending a S-NB MODIFICATION CONFIRM message to the secondary base station 504 (S-NB) (step 5c).

In an aspect, the secondary base station 504 (S-NB) connection establishment may be made over MCG. In another aspect, the secondary base station 504 (S-NB) connection establishment may be made using the same principles as a handover. For example, the secondary base station 504 (S-NB) connection may be established similarly to LWA. Establishing the secondary base station 504 (S-NB) connection using the same principles as a handover, e.g., similarly to LWA may have advantages. The NR signaling connection may take advantage of NR radio performance (such as lower latency), the master base station 502 (M-NB) impact may be smaller because LTE may just needs to be involved in the initial NR connection establishment, the NR C-plane activities will not interrupt M-NB so each RAT can work completely independently once NR connection is established, and mobility management in each RAT may be independent.

Figure 9:
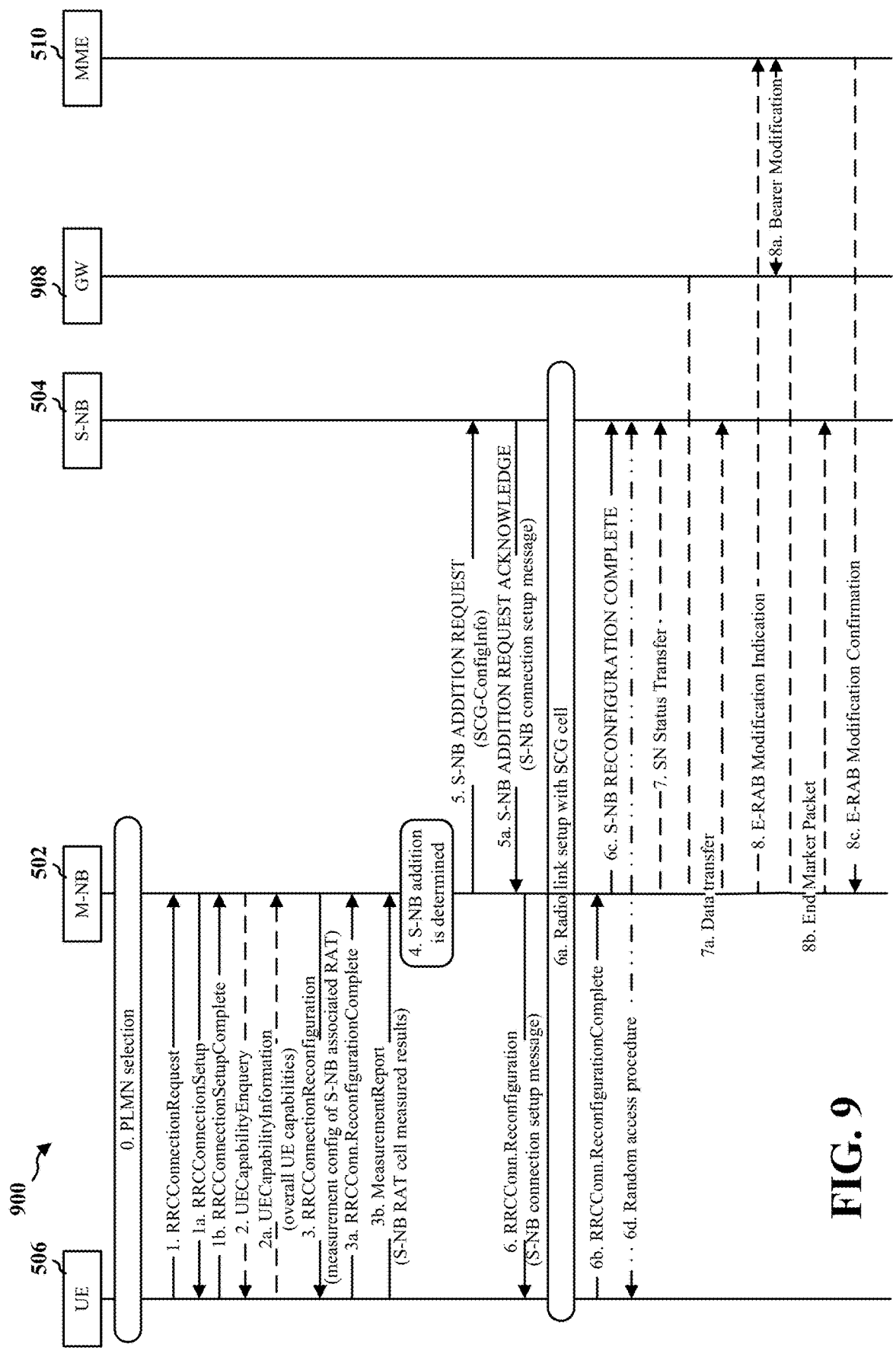
FIG. 9 is a diagram illustrating a secondary base station connection setup call-flow.

FIG. 9 is a diagram 900 illustrating a secondary base station 504 (S-NB) connection setup call-flow. The diagram 900 includes a master base station 502, a UE 506, a GW 908 and a MME 510. A RAB establishment procedure and security mode command procedure may take place after step 1, but the RAB establishment procedure and security mode command procedure are omitted in the call-flow illustrated in FIG. 9.

At step 0, the UE 506 performs a PLMN search and camps on a master base station 502 (M-NB) associated RAT cell.

At step 1, the UE 506 establishes an RRC connection with the master base station 502 (M-NB).

At step 2, (optional) the master base station 502 (M-NB) requests the UE 506 to report the UE 506 capability e.g. when the master base station 502 (M-NB) fails to obtain the UE capability for the UE 506 from a core network entity (e.g. MME). The UE 506 reports overall UE capability information to the master base station 502 (M-NB).

At step 3, the master base station 502 (M-NB) configures the UE 506 with measurement configuration of the secondary base station 504 (S-NB) associated RAT (S-NB RAT) and then the UE 506 starts the secondary base station 504 (S-NB) RAT measurements accordingly. The UE 506 sends a measurement report message including the measured results of the detected the secondary base station 504 (M-NB) RAT cells when certain reporting criteria are met.

At step 4, the master base station 502 (M-NB) decides to add a secondary connection with the secondary base station 504 (S-NB) associated with the reported cell based on e.g. the measured results of the cell(s) and the remaining capacities at the master base station 502 (M-NB) and/or the secondary base station 504 (S-NB).

At step 5, the master base station 502 (M-NB) requests the secondary base station 504 (S-NB) to allocate radio resources for a specific E-RAB, indicating E-RAB characteristics (E-RAB parameters, TNL address information corresponding to bearer type).

In addition, the master base station 502 (M-NB) indicates within SCG-ConfigInfo the secondary base station 504 (S-NB) associated RAT's UE capabilities to be used as basis for the reconfiguration by the secondary base station 504 (S-NB). Furthermore, M-NB indicates within SCG-ConfigInfo the security key S-K*$_{NB}$ for S-NB security enforcement as well as the corresponding SCG Count used for the key derivation.

The master base station 502 (M-NB) can provide the latest measurement results for the SCG cell(s) requested to be added. The secondary base station 504 (S-NB) may reject the request.

At step 5a, when the RRM entity in the secondary base station 504 (S-NB) is able to admit the resource request, it allocates respective radio resources and, dependent on the bearer option, respective transport network resources.

FFS, maybe optional (The secondary base station 504 (S-NB) triggers Random Access so that synchronisation of the secondary base station 504 (S-NB) radio resource configuration can be performed.)

The secondary base station 504 (S-NB) provides the new radio resource of SCG in SCG-Config to the master base station 502 (M-NB). For SCG bearers, the secondary base station 504 (S-NB) provides the new radio resource of the SCG together with NG3 DL TNL address information for the respective E-RAB and security algorithm, for split bearers together with XN/X2 DL TNL address information.

In contrast to SCG bearer, for the split bearer option the master base station 502 (M-NB) may either decide to request resources from the secondary base station 504 (S-NB) of such an amount, that the QoS for the respective E-RAB is guaranteed by the exact sum of resources provided by the master base station 502 (M-NB) and the secondary base station 504 (S-NB) together, or even more. The NBs decision may be reflected in step 5 by the E-RAB parameters signalled to the secondary base station 504 (S-NB), which may differ from E-RAB parameters received over S1/NG2.

For a specific E-RAB, the master base station 502 (M-NB) may request the direct establishment of an SCG or a Split bearer, i.e., without first having to establish an MCG bearer.

In case of MCG split bearers, transmission of user plane data may take place after step 5*a*.

In case of SCG bearers or SCG split bearers, data forwarding and the SN Status Transfer may take place after step 5*a*.

At step 6, the master base station 502 (M-NB) sends the RRCConnectionReconfiguration message to the UE 506 including the new radio resource configuration of SCG according to the SCG-Config.

The UE 506 applies the new configuration and replies with RRCConnectionReconfigurationComplete message. In case the UE 506 is unable to comply with (part of) the configuration included in the RRCConnectionReconfiguration message, it performs the reconfiguration failure procedure.

The master base station 502 (M-NB) informs the secondary base station 504 (S-NB) that the UE 506 has completed the reconfiguration procedure successfully. FFS, maybe optional (6*d*. The UE 506 performs synchronisation towards the PSCell of the secondary base station 504 (S-NB). The order the UE 506 sends the RRCConnectionReconfigurationComplete message and performs the Random Access procedure towards the SCG is not defined. The successful RA procedure towards the SCG is not required for a successful completion of the RRC Connection Reconfiguration procedure.)

At step 7, in case of SCG bearers or SCG split bearers, and dependent on the bearer characteristics of the respective E-RAB, the master base station 502 (M-NB) may take actions to minimise service interruption due to activation of dual connectivity (Data forwarding, SN Status Transfer).

At step 8, for SCG bearers, the update of the UP path towards the EPC is performed.

Figure 10:
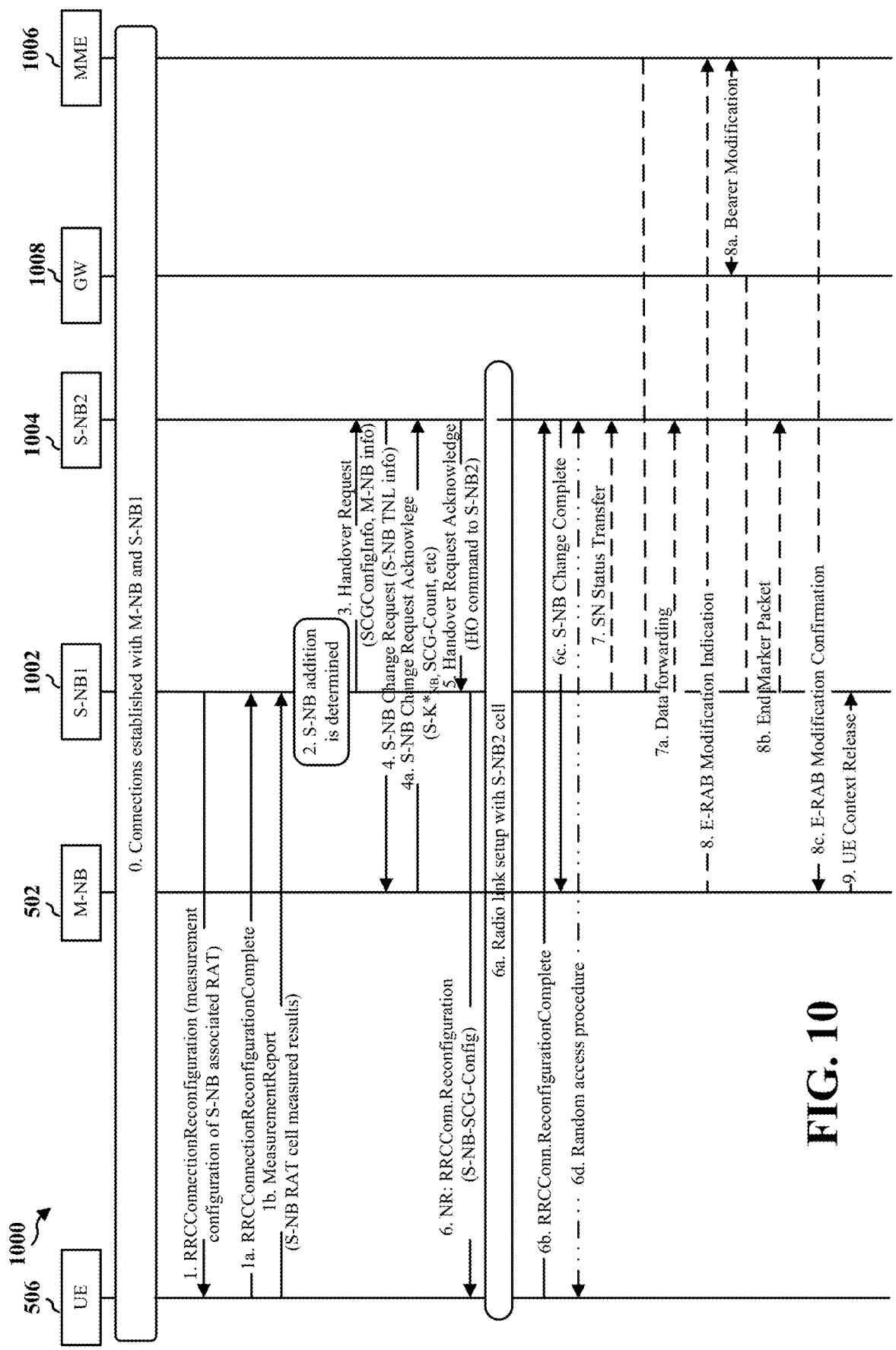
FIG. 10 is a diagram illustrating a change of secondary base station call-flow.

FIG. 10 is a diagram 1000 illustrating a change of secondary base station (S-NB) 1002, 1004 call-flow. At step 0, the UE 506 and the network establish dual connectivity connections with a master base station 502 (M-NB) and a secondary base station 1002 (S-NB1). At step 1, the secondary base station 1002 (S-NB1) reconfigures the UE 506 with the measurement configuration of the secondary base station 1002 (S-NB1) associates RAT (S-NB RAT). For example, the secondary base station 1002 (S-NB1) transmits a RRCConnectionReconfiguration (measurement configuration of S-NB associated RAT) to the UE 506 (step 1). The UE 506 performs the measurement. The UE 506 sends a reconfiguration complete (RRCConnectionReconfigurationComplete) to the secondary base station 1002 (S-NB 1). The UE 506 sends the he secondary base station 1002 (S-NB1) a measurement report message including the S-NB RAT cell(s)' measured results when certain reporting criteria are met, e.g., a MeasurementReport S-NB RAT cell measured results) (step 1*b*).

At step 2, the secondary base station 1002 (S-NB1) determines the change of secondary base station based on e.g. the measured results of the cell(s) and the remaining capacities at the secondary base station 1002 (S-NB1) and/or the secondary base station 1004 (S-NB2).

At step 3, the secondary base station 1002 (S-NB1) initiates the change of secondary base station by requesting the target secondary base station 1004 (S-NB 2) 1004 (S-NB2) to allocate resources for the UE 506 by means of the handover preparation procedure.

The secondary base station 1002 (S-NB1)includes the SCG configuration of the old secondary base station 1002 (S-NB1)as well as the UE 506 capability information currently stored in the secondary base station 1002 (S-NB1)in the Handover Request.

At step 4, when the allocation of target secondary base station 1004 (S-NB2) resources was successful, the secondary base station 1004 (S-NB2)requests the master base station 502 (M-NB) to change the secondary base station towards the secondary base station 1004 (S-NB2). The secondary base station 1004 (S-NB 2) provides the S-NB TNL information (for SCG bearers NG3 DL TNL address information for the respective E-RAB, for split bearers XN/X2 DL TNL address information). The master base station 502 (M-NB) derives a S-K*$_{NB}$ with a new SCG Count value for the target secondary base station 1004 (S-NB2)and the master base station 502 (M-NB) delivers the derived S-K*$_{NB}$ and the corresponding SCG-Count by means of secondary base station Change Request Acknowledge procedure.

In case of MCG split bearers, transmission of user plane data may take place after step 4. In case of SCG bearers or SCG split bearers, data forwarding and the SN Status Transfer may take place after step 4.

At step 5, when the allocation of target secondary base station 1004 (S-NB 2) resources was successful and the master base station 502 (M-NB) acknowledges the secondary base station change, the target secondary base station 1004 (S-NB2)acknowledges the Handover Request by a Handover Request Acknowledge message. When forwarding is needed, the target secondary base station 1004 (S-NB2)provides forwarding addresses to the source secondary base station 1002 (S-NB1).

Then the secondary base station 1002 (S-NB1)initiates the release of the resources towards the UE. Either direct data forwarding or indirect data forwarding is used for SCG bearer or SCG split bearer. Reception of the Handover Request Acknowledge message triggers the source secondary base station 1002 (S-NB1)to stop providing user data to the UE 506 and, if applicable, to start data forwarding.

At step 6, the secondary base station 1002 (S-NB1)sends the RRCConnectionReconfiguration message to the UE 506, e.g., directly (e.g., via SCG SRB). The UE 506 sends the RRCConnectionReconfigurationComplete message back to the secondary base station 1004 (S-NB2), e.g., directly (e.g., via SCG SRB at the secondary base station 1004 (S-NB2)).

The master base station 502 (M-NB) indicates the new configuration in the RRCConnectionReconfiguration message towards the UE 506. In case the UE 506 is unable to comply with (part of) the configuration included in the RRCConnectionReconfiguration message, the master base station 502 performs the reconfiguration failure procedure.

At step 6*c*, when the RRC connection reconfiguration procedure was successful, the informs the master base station 502 (M-NB) the successful completion of the secondary base station change. For example, the secondary base station 1004 (S-NB 2) may send a "Change Complete" to the master base station 502 (M-NB).

At step 6*d*, the UE 506 and the S-NB2 may optionally perform a random access procedure. (The UE 506 synchronizes to the target secondary base station 1004 (S-NB 2)).

At step 7, when applicable, data forwarding from the secondary base station 1002 (S-NB1)takes place. Data forwarding may be initiated as early as the secondary base station 1002 (S-NB1)receives the Handover Request Acknowledge message from the secondary base station 1004(S-NB2).

At step 8, when one of the bearer contexts was configured with the SCG bearer option or the SCG split bearer option at the source S-NB, a path update is triggered by the MeNB.

At step 9, upon reception of the UE Context Release message, the source base station secondary base station can release radio and C-plane related resource associated to the UE context. Any ongoing data forwarding may continue.

Figure 11:
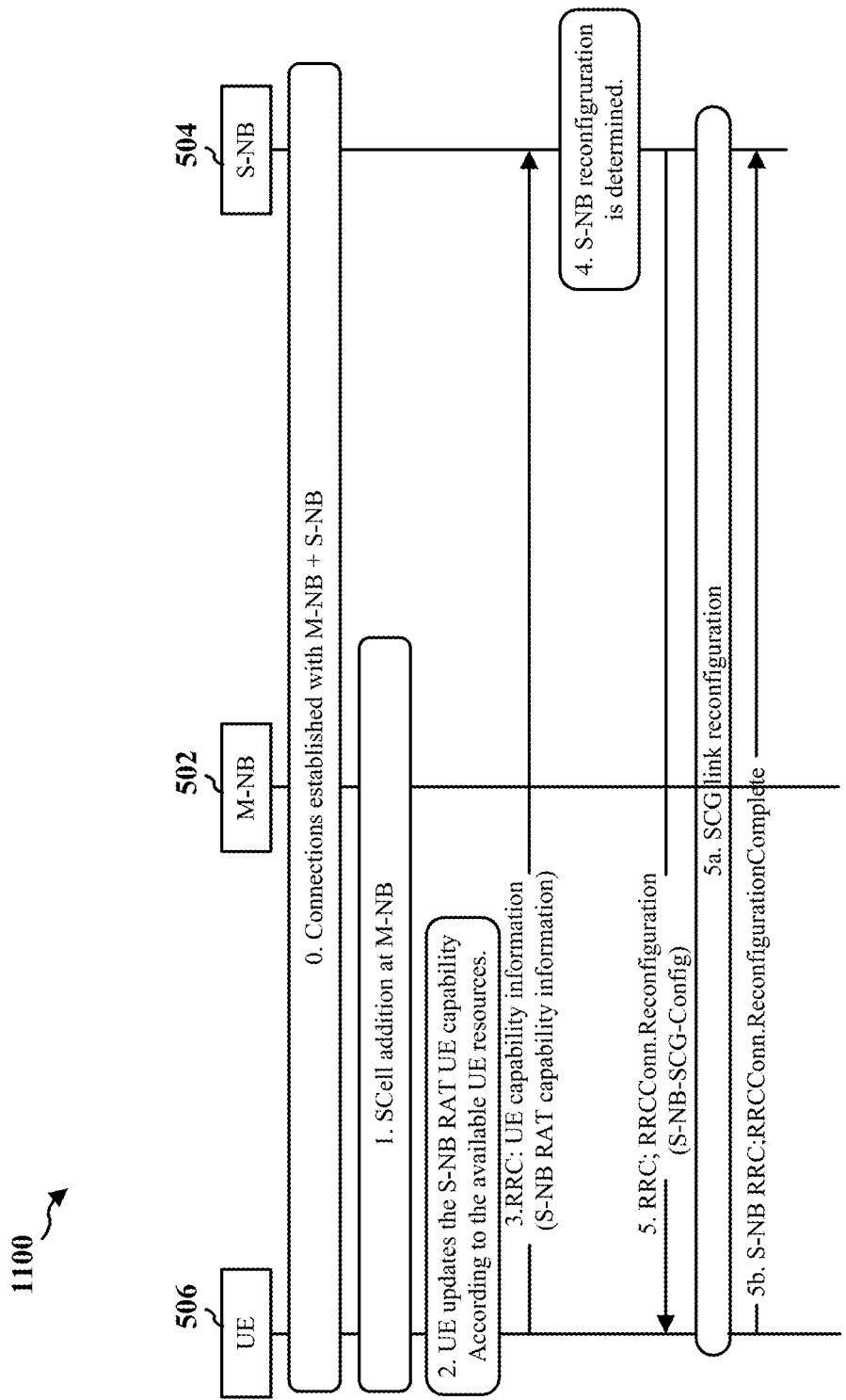
FIG. 11 is a diagram illustrating a secondary base station connection reconfiguration procedure upon UE capability update.

FIG. 11 is a diagram 1100 illustrating a secondary base station 504 (S-NB) connection reconfiguration procedure upon UE capability update. The diagram 1100 includes a master base station 502 (M-NB) and a UE 506.

At step 0, the UE 506 and RAN establish connections with the master base station 502 (M-NB) and the secondary base station 504 (S-NB).

At step 1, the master base station 502 (M-NB) determines a SCell addition and reconfigures the UE 506 with the new CA configuration.

At step 2, the UE 506 updates the other RAT's UE capability information based on the remaining UE's resources (e.g. available RF chains).

At step 3, the UE 506 reports the updated UE capability information to the secondary base station 504 (S-NB).

At step 4, the secondary base station 504 (S-NB) reallocates the resources for the UE 506 based on the updated UE 506 capability information and determines to reconfigure the UE 506 accordingly.

At step 5, the secondary base station 504 (S-NB) reconfigures the SCG link (step 5a) by sending an RRCConnectionReconfiguration message (step 5) from the secondary base station 504 (S-NB) SRB to the UE 506. The UE 506 performs the commanded reconfiguration and sends back a response message after the reconfiguration, e.g., the RRC-Connection Reconfiguration Complete (step 5b).

In an aspect, the NR RRC may be sent over a split SRB. The aspect may use the split bearer concept introduced in Rel-12 LTE DC for user data transfer to signal S-NB RRC messages. The aspect may include one or more advantages of other aspects described herein. For example, a reliable connection may be used for the secondary base station 504 (S-NB) RRC signaling and so it works efficiently, e.g., when the secondary base station 504 (S-NB) is deployed on a mmW frequency. The secondary base station 504 (S-NB) RRC signaling connection may take advantage of NR radio performance (such as lower latency). The master base station 502 (M-NB) impact may be smaller because LTE just needs to be involved in the initial NR connection establishment. The secondary base station 504 (S-NB) C-plane activities will not interrupt master base station 502 (M-NB) so each RAT can work completely independently once the secondary base station 504 (S-NB) connection is established. Mobility management in each RAT may become independent.

Figure 12:
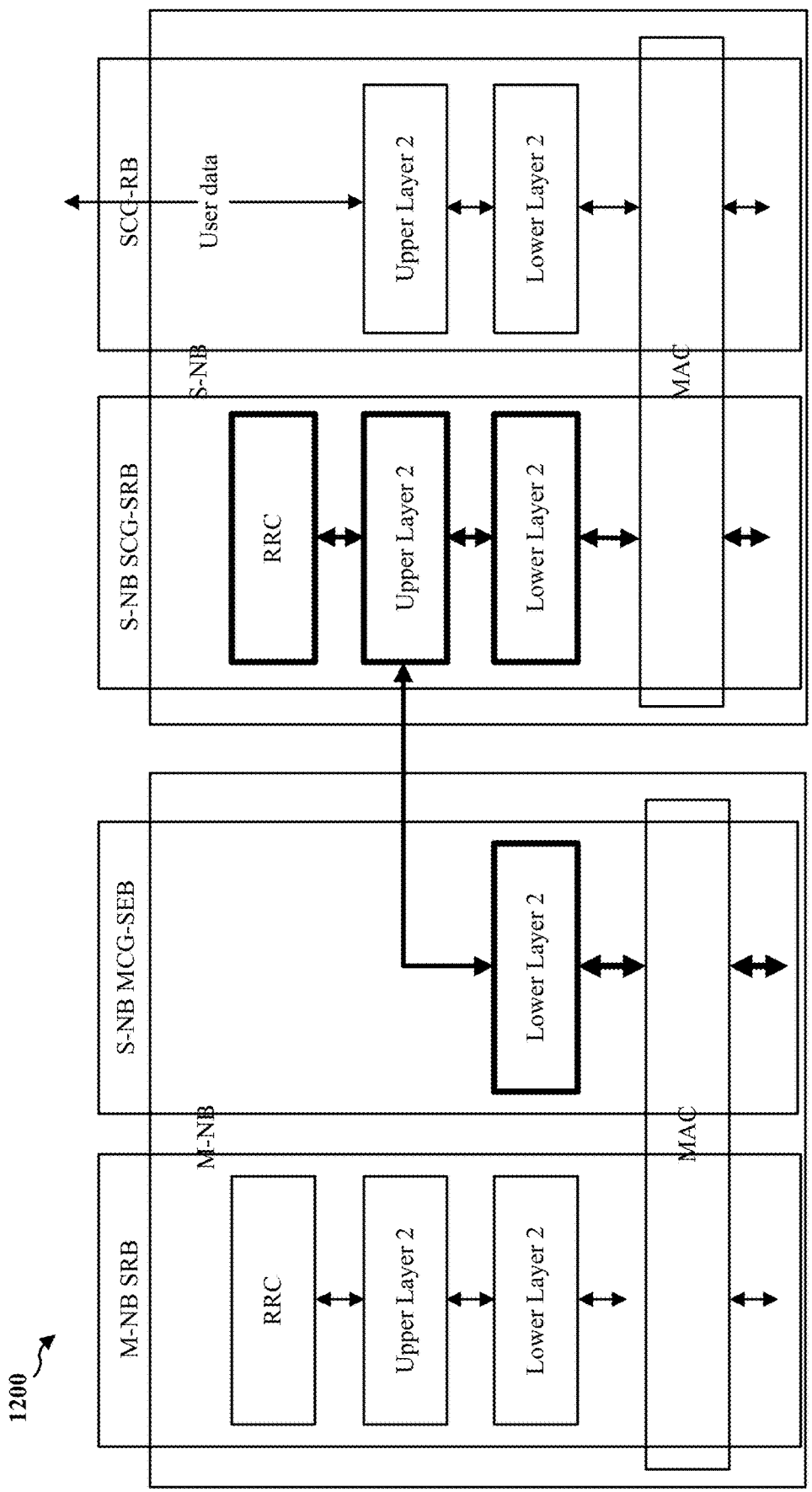
FIG. 12 is a diagram illustrating a communication system including a split SRB RAN protocol architecture.

FIG. 12 is a diagram illustrating a communication system 1200 including a split SRB RAN protocol architecture. The split SRB RAN protocol architecture portion of the communication system 1200 is in bold. The upper layer 2 comprises a PDCP entity. The lower layer 2 comprises a RLC entity.

In an aspect, the secondary base station 504 (S-NB) RRC may be delivered either by one of the serving cells in the master cell group (MCG) or by one of the serving cells in the secondary cell group (SCG). For downlink SRB selection, determining how to select the downlink SRB may be left to NW implementation. In an aspect, the secondary base station 504 (S-NB) selects either the secondary base station 504 (S-NB) MCG-SRB or the secondary base station 504 (S-NB) SCG-SRB based on either the radio condition (e.g., based on CSI, BLER of each link) or the congestion status of each radio link. For example, the secondary base station 504 (S-NB) MCG-SRB may be selected when MCG radio link reports much better CQI than SCG radio link and the CQI of the SCG radio link is below a certain threshold.

For uplink SRB selection, a UE 506 signals the uplink SRB data. Accordingly, the UE 506 may need to determine which SRB may be used for the transfer. The following example options may be used, (1) down link SRB selection based, (2) configuration based, or (3) radio condition based.

For down link SRB selection based (1), the same radio link may be used for a corresponding downlink SRB signal. The option may be used for response messages such as: RRCConnectionReconfigurationComplete.

For configuration based (2), the RAN signals to the UE 506 which SRB may be used to transmit a certain UL RRC message. For example, Measurement configuration indicates which SRB may be used for a corresponding MeasurementReport message. In an aspect, the RAN signals to the UE, which SRB should be used to transmit a certain UL RRC message.

For radio condition based (3), the UE 506 selects either MCG-SRB or SCG-SRB based on the radio conditions of each radio link.

Figure 13:
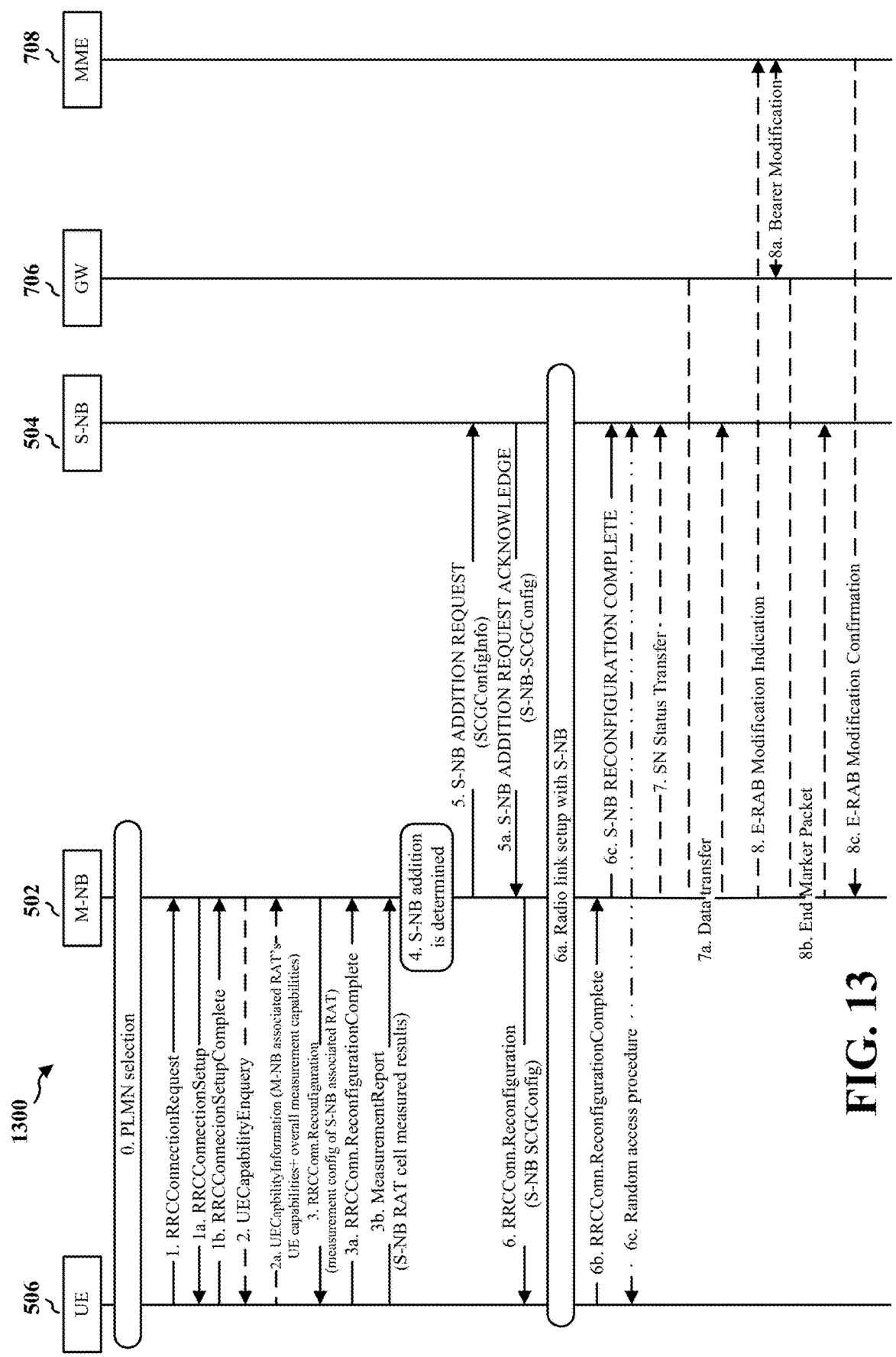
FIG. 13 is a diagram illustrating secondary base station connection setup call flow.

FIG. 13 is a diagram 1300 illustrating secondary base station 504 (S-NB) connection setup call flow. The diagram 1300 illustrates an example of call-flows of a secondary connection setup and a secondary secondary base station 504 (S-NB) change procedures. In an aspect, for a RAB establishment procedure and security mode command procedure may take place after step 1, however, the RAB establishment procedure and the security mode command procedure may be omitted in the call-flow.

At step 0, the UE 506 performs a PLMN search and camps on a master base station 502 (M-NB) associated RAT cell.

At step 1, the UE 506 establishes an RRC connection with the master base station 502 (M-NB).

At step 2, (optional) the master base station 502 (M-NB) requests the UE 506 to report the UE capability e.g. when the master base station 502 (M-NB) fails to obtain the UE capability for the UE 506 from a core network entity (e.g. MME). The UE 506 reports master base station 502 (M-NB) associated RAT's UE capabilities and overall measurement capabilities to the master base station 502 (M-NB).

At step 3, the master base station 502 (M-NB) configures the UE 506 with measurement configuration of the S-NB associated RAT (S-NB RAT) and then the UE 506 starts the secondary base station 504 (S-NB) RAT measurements accordingly. The UE 506 sends a measurement report message including the measured results of the detected the secondary base station 504 (S-NB) RAT cells when certain reporting criteria are met.

At step 4, the master base station 502 (M-NB) decides to add a secondary connection with the secondary base station 504 (S-NB) associated with the reported cell based on e.g. the measured results of the cell(s) and the remaining capacities at the master base station 502 (M-NB) and/or the secondary base station 504 (S-NB).

At step 5, the master base station 502 (M-NB) requests the secondary base station 504 (S-NB) to allocate radio resources for the secondary base station 504 (S-NB) split SRB(s) and a specific E-RAB, indicating E-RAB characteristics (E-RAB parameters, TNL address information corresponding to bearer type).

In addition, M-NB indicates within SCG-ConfigInfo the secondary base station 504 (S-NB) associated RAT's UE capabilities to be used as basis for the reconfiguration by the secondary base station 504 (S-NB). Furthermore, master base station 502 (M-NB) indicates within SCG-ConfigInfo the security key S-K*$_{NB}$ for the secondary base station 504 (S-NB) security enforcement as well as the corresponding SCG Count used for the key derivation.

The master base station 502 (M-NB) can provide the latest measurement results for the SCG cell(s) requested to be added. The secondary base station 504 (S-NB) may reject the request (reject the request at step 6*a*).

When the RRM entity in the secondary base station 504 (S-NB) is able to admit the resource request, it allocates respective radio resources and, dependent on the bearer option, respective transport network resources.

FFS, maybe optional (The secondary base station 504 (S-NB) triggers Random Access so that synchronisation of the secondary base station 504 (S-NB) radio resource configuration can be performed.)

The secondary base station 504 (S-NB) provides the new radio resource of SCG in SCG-Config to the master base station 502 (M-NB). For SCG bearers, the secondary base station 504 (S-NB) provides the new radio resource of the SCG together with NG3 DL TNL address information for the respective E-RAB and security algorithm, for split bearers together with XN/X2 DL TNL address information.

In contrast to SCG bearer, for the split bearer option the master base station 502 (M-NB) may either decide to request resources from the secondary base station 504 (S-NB) of such an amount, that the QoS for the respective E-RAB is guaranteed by the exact sum of resources provided by the master base station 502 (M-NB) and the secondary base station 504 (S-NB) together, or even more. The NBs decision may be reflected in step 5 by the E-RAB parameters signalled to the secondary base station 504 (S-NB), which may differ from E-RAB parameters received over S1/NG2.

For a specific E-RAB, the master base station 502 (M-NB) may request the direct establishment of an SCG or a Split bearer, i.e., without first having to establish an MCG bearer.

In case of MCG split bearers, transmission of user plane data may take place after step 6*a*.

In case of SCG bearers or SCG split bearers, data forwarding and the SN Status Transfer may take place after step 6*a*.

At step 6, master base station 502 (M-NB) sends the RRCConnectionReconfiguration message to the UE 506 including the new radio resource configuration of SCG according to the secondary base station 504 (S-NB) SCG-Config.

The UE 506 applies the new configuration and replies with RRCConnectionReconfigurationComplete message. In case the UE 506 is unable to comply with (part of) the configuration included in the RRCConnectionReconfiguration message, it performs the reconfiguration failure procedure.

FFS, maybe optional (7*c*. The UE 506 performs synchronisation towards the PSCell of the secondary base station 504 (S-NB). The order the UE 506 sends the RRCConnectionReconfigurationComplete message and performs the Random Access procedure towards the SCG is not defined. The successful RA procedure towards the SCG is not required for a successful completion of the RRC Connection Reconfiguration procedure.) 7*d*. The master base station 502 (M-NB) informs the secondary base station 504 (S-NB) that the UE 506 has completed the reconfiguration procedure successfully.

At step 7, in case of SCG bearers or SCG split bearers, and dependent on the bearer characteristics of the respective E-RAB, the master base station 502 (M-NB) may take actions to minimise service interruption due to activation of dual connectivity (Data forwarding, SN Status Transfer).

At step 8, for SCG bearers, the update of the UP path towards the EPC may be performed.

Figure 14:
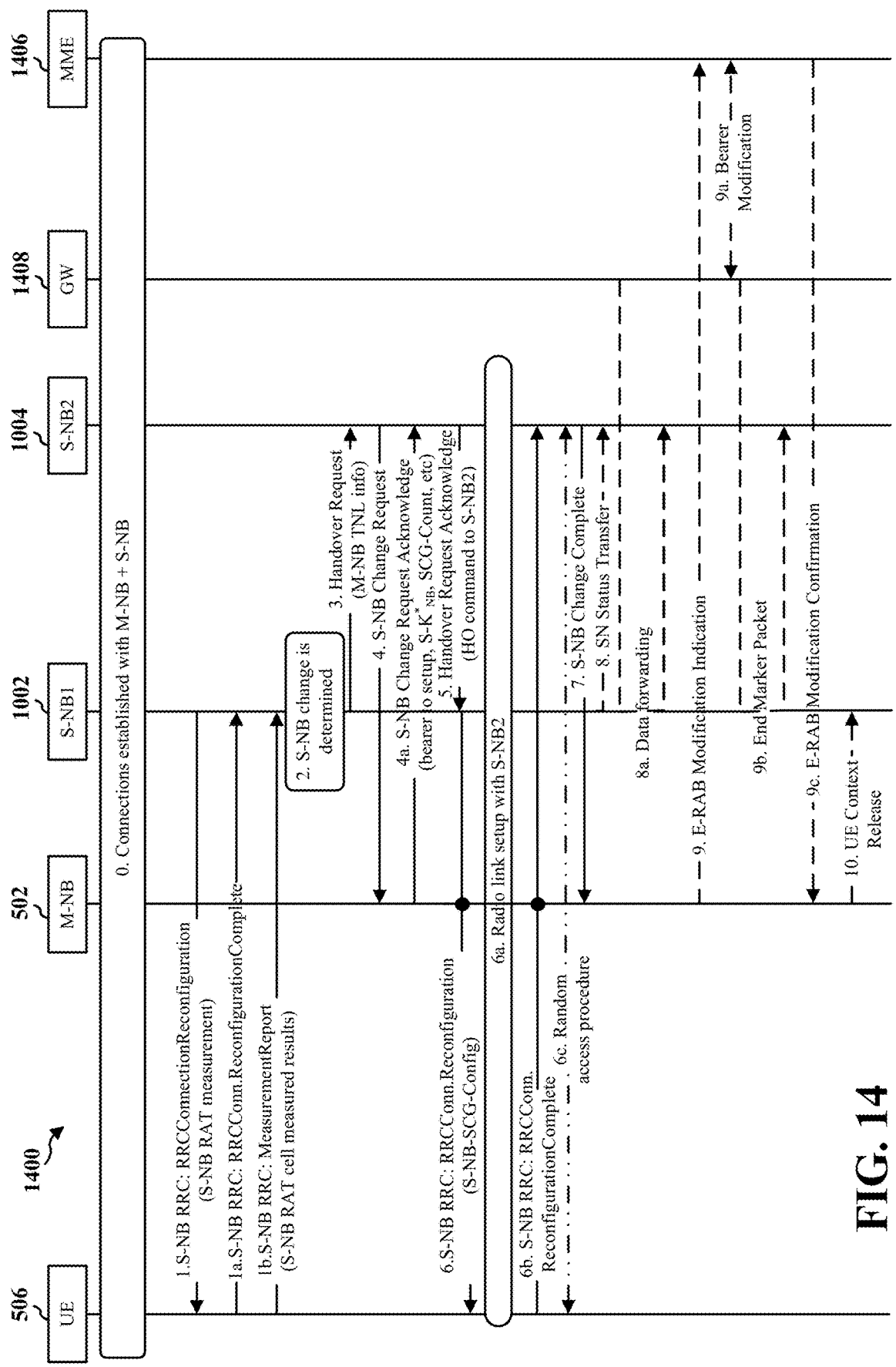
FIG. 14 is a diagram illustrating an option for changes of a secondary base station 504 call-flow (option 3).

FIG. 14 is a diagram illustrating an option for changes of a secondary base station 504 call-flow. At step 0, the UE 506 and the network establish dual connectivity connections with master base station 502 (M-NB) and a secondary base station 1002 (S-NB1).

At step 1, the secondary base station 1002 (S-NB1) reconfigures the UE 506 with the measurement configuration of a secondary base station (S-NB) such as secondary base stations 1002, 1004 associated RAT (S-NB RAT). The secondary base station 1002 (S-NB1)transmits RRCConnectionReconfiguration to the UE 506 via either MCG radio link or SCG radio link. The UE 506 responds with an RRCConn.ReconfigurationComplete to the secondary base station 1002 (S-NB1) via either MCG radio link or SCG radio link. The UE 506 also transmits RRC: MeasurementReport (S-NB RAT cell measured results) to the secondary base station 1002 (S-NB1)(step 1*b*) via either MCG radio link or SCG radio link.

At step 2, the secondary base station 1002 (S-NB1) determines the change of secondary base station (S-NB) based on, e.g., the measured results of the cell(s) and the remaining capacities at the secondary base station 1002 (S-NB1)and/or the secondary base station 1004 (S-NB2).

At step 3, the secondary base station 1002 (S-NB1) initiates the change of secondary base station (S-NB), e.g., the secondary base station 1004 (S-NB2), by requesting the target secondary base station 1004 (S-NB2)to allocate resources for the UE 506 by means of the handover preparation procedure. the secondary base station 1002 (S-NB1) includes the SCG configuration of the old secondary base station (S-NB1)as well as the UE 506 capability information currently stored in the secondary base station (S-NB1)in the handover request message.

At step 4, when the allocation of target secondary base station 1004 (S-NB2) resources is successful, the secondary base station 1004 (S-NB2)requests master base station 502 (M-NB) to change the secondary base station to the secondary base station 1004 (S-NB2).

The secondary base station 1004 (S-NB2)provides the secondary base station 1004 (S-NB2)TNL information (for SCG bearers NG3 DL TNL address information for the respective E-RAB, for split bearers XN/X2 DL TNL address information). The master base station 502 (M-NB) derives an S-K*$_{NB}$ with a new SCG Count value for the target secondary base station 504 (S-NB) and the master base station 502 (M-NB) delivers the derived S-K*$_{NB}$ and the corresponding SCG-Count by means of S-NB Change Request Acknowledge procedure (step 4*a*).

In case of MCG split bearers, transmission of user plane data may take place after step 4. In case of SCG bearers or SCG split bearers, data forwarding and the SN Status Transfer may take place after step 4, e.g., data forwarding at step 8*a* and the SN Status Transfer at step 8.

At step 5, when the allocation of target secondary base station 1004 (S-NB2) resources is successful and the master base station 502 (M-NB) acknowledges the secondary base station 1004 (S-NB2)change (e.g., at step 4*a*), the target secondary base station 1004 (S-NB2)acknowledges the handover request by a Handover Request Acknowledge message. When forwarding is needed, the target secondary base station 1004 (S-NB2)provides forwarding addresses to the source base station 1002 (S-NB1)(step 5).

The secondary base station 1002 (S-NB1) initiates the release of the resources towards the UE 506, e.g., as part of step 6*a*.

Either direct data forwarding or indirect data forwarding may be used for SCG bearer or SCG split bearer, e.g., at step 8*a*. Reception of the Handover Request Acknowledge message (of step 5) triggers the source secondary base station 1002 (S-NB1) to stop providing user data to the UE and, if applicable, to start data forwarding, e.g., at step 8*a*.

At step 6, the secondary base station 1002 (S-NB1) sends the RRCConnectionReconfiguration message to the UE 506, e.g., via the master base station 502 (M-NB). The UE 506 sends the RRCConnectionReconfigurationComplete message back to the secondary base station 1004 (S-NB2), e.g., via the master base station 502 (M-NB).

In case the UE 506 is unable to comply with a part of the configuration included in the RRCConnectionReconfiguration message, the UE 506 may perform the reconfiguration failure procedure. The step 6*c*, FFS, may be optional. The UE synchronizes to the target S-NB, e.g., at step 6*a* or step 6*b*.

The RRCConnectionReconfiguration message at step 6 is sent via either MCG radio link (i.e. via MCG SRB or split SRB's MCG link) or SCG radio link (i.e. via SCG SRB or split SRB's SCG link). The RRCConnectionReconfigurationComplete message at step 6*b* may be sent via either MCG SRB radio link (i.e. via MCG SRB or split SRB's MCG link) or S-NB SCG SRBradio link (i.e. via SCG SRB or split SRB's SCG link). The uplink SRB selection may be based on the downlink SRB selection or a NW configuration.

At step 7, when the RRC connection reconfiguration procedure was successful, the target secondary base station 1004 (S-NB2) informs the master base station 502 (M-NB) of the successful completion of the S-NB change.

At step 8, when applicable, data forwarding from the source S-NB takes place. Data forwarding may be initiated as early as the source S-NB receives the S-NB Release Request message from the master base station 502 (M-NB).

At step 9, when one of the bearer contexts was configured with the SCG bearer option at the source base station S-NB, a path update may be triggered by the master base station 502 (M-NB), which may trigger a bearer modification from the MME 1406 to the GW 1408 (e.g., step 9*a*), end marker packet from the secondary base station 1002 (e.g., step 9*b*), and E-RAB modification confirmation from the MME 1406 (e.g., step 9*c*).

At step 10, upon reception of the UE context release message, from the master base station 502 (M-NB), the source secondary base station 1002 (S-NB1) may release radio and C-plane related resource associated to the UE context. Ongoing data forwarding may continue.

Figure 15:
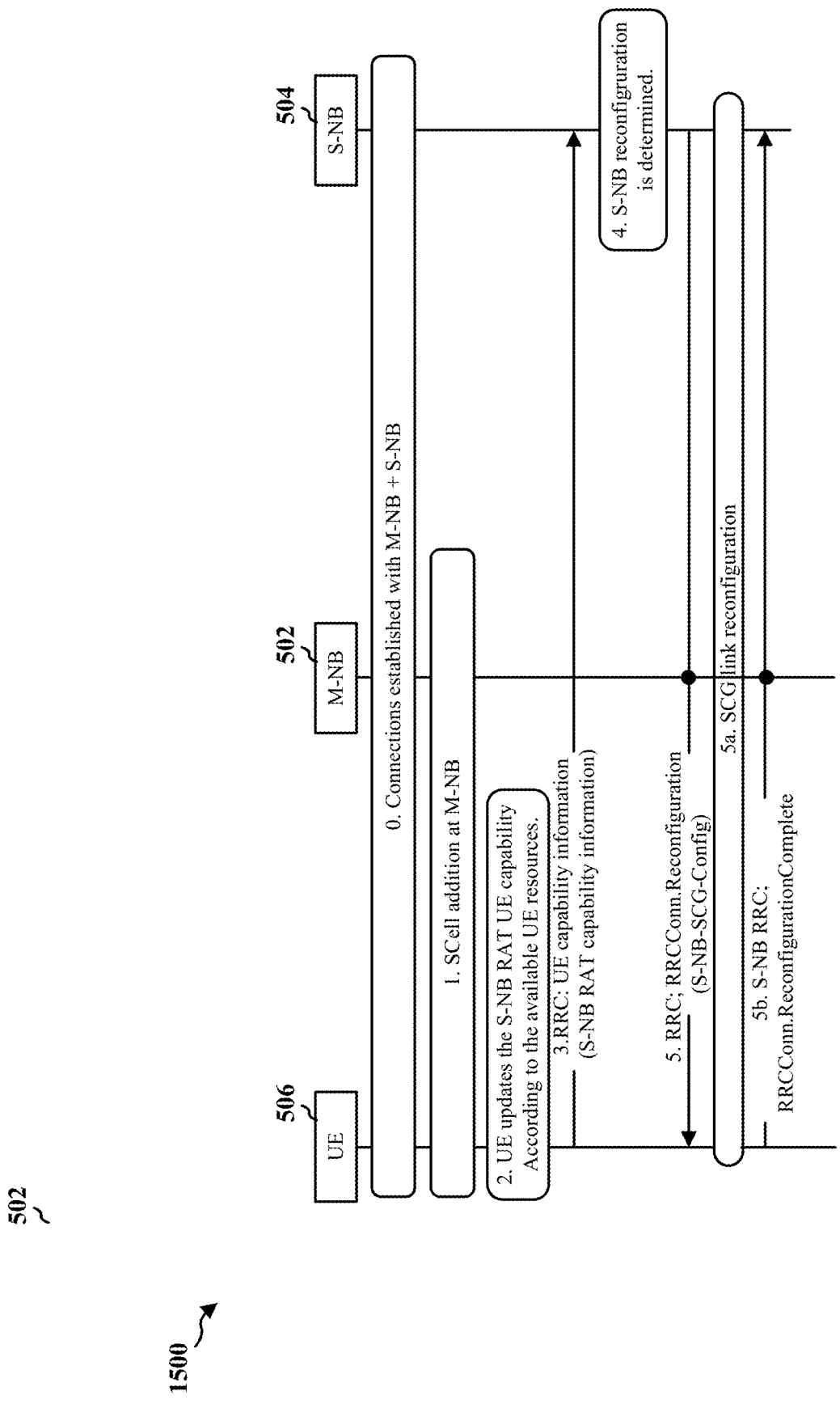
FIG. 15 is a diagram illustrating an example of secondary/secondary base station reconfiguration upon a UE capability update.

FIG. 15 is a diagram 1500 illustrating an example of secondary/secondary base station 504 reconfiguration upon a UE 506 capability update. The diagram 1500 includes the master base station 502, the secondary base station 504, and the UE 506.

At step 0, the UE 506 and RAN establish connections with the master base station 502 (M-NB) and the secondary base station 504 (S-NB).

At step 1, the master base station 502 (M-NB) determines a SCell addition and reconfigures the UE 506 with the new CA configuration.

At step 2, the UE 506 updates the other RAT's UE capability information based on the remaining UE's resources (e.g. available RF chains).

At step 3, the UE 506 reports the updated UE capability information to the secondary base station 504 (S-NB).

At step 4, the secondary base station 504 (S-NB) reconfiguration is determined. Accordingly, the secondary base station 504 (S-NB) may reallocate the resources for the UE based on the updated UE capability information and determines to reconfigure the UE accordingly.

At step 5, the S-NB reconfigures the SCG link by sending an RRCConnectionReconfiguration message via either S-NB MCG SRB or S-NB SCG SRB. The UE 506 performs the commanded reconfiguration and sends back a response message after the reconfiguration, e.g., at steps 5*a* and 5*b*.

Figure 16:
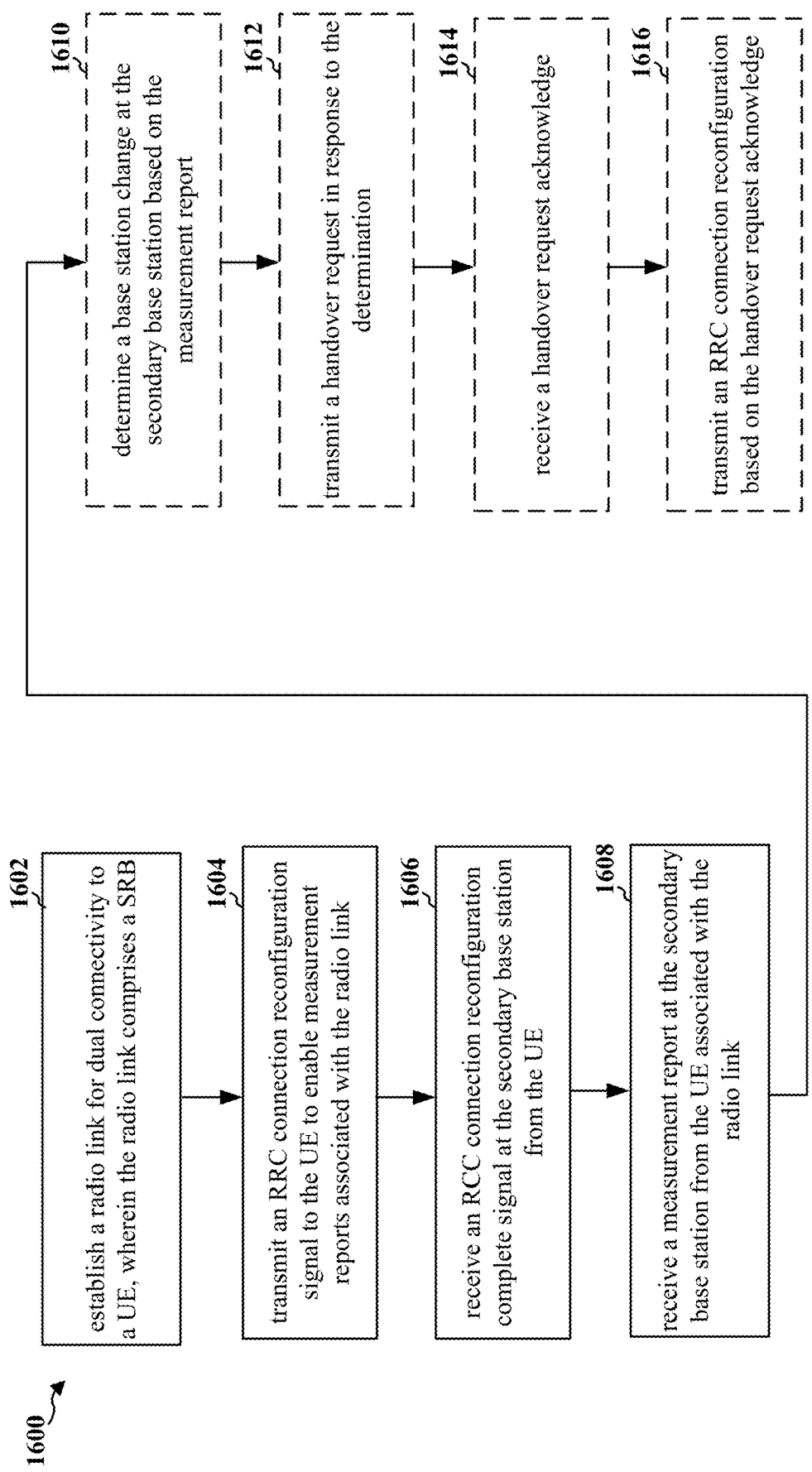
FIG. 16 is a flowchart of a method of wireless communication.

FIG. 16 is a flowchart 1600 of a method of wireless communication. The method may be performed by a base station (e.g., the base station 102, 180, 310, 402, 502, 504, 1002, 1004). The base station may be a secondary base station 1002, 1004 (S-NB, SNB1, S-NB2). At 1602, the base station establishes a radio link for dual connectivity to a UE. The radio link including a SRB. For example, the base station 102, 180, 310, 402, 1002 establishes a radio link for dual connectivity to a UE (FIG. 10, step 0; FIG. 14, step 0). The radio link including a SRB. In an aspect, the radio link comprises a RAT.

At 1604, the base station transmits a RRC connection reconfiguration signal to the UE to enable measurement reports associated with the radio link. For example, the base station 102, 180, 310, 402, 1002 transmits a RRC connection reconfiguration signal to the UE to enable measurement reports associated with the radio link (FIG. 10, step 1; FIG. 14, step 1). In an aspect, the RRC connection reconfiguration is transmitted to the UE. In an aspect, the RRC connection reconfiguration is forwarded to a master base station.

At 1606, the base station receives an RCC connection reconfiguration complete signal at the secondary base station from the UE. For example, the base station 102, 180, 310, 402, 1002 receives an RCC connection reconfiguration complete signal at the secondary base station 102, 180, 310, 402, 1002 from the UE 506 (FIG. 10, step 1*a*; FIG. 14, step 1*a*).

At 1608, the base station receives a measurement report at the secondary base station from the UE associated with the radio link. For example, the base station 102, 180, 310, 402, 1002 receives a measurement report at the secondary base station 102, 180, 310, 402, 1002 from the UE 506 associated with the radio link (FIG. 10, step 1*b*; FIG. 14, step 1*b*).

At 1610, the base station determines a base station change at the secondary base station based on the measurement report. For example, the base station 102, 180, 310, 402, 1002 determines a base station change at the secondary base station 102, 180, 310, 402, 1002 based on the measurement report (FIG. 10, step 2; FIG. 14, step 2).

At 1612, the base station transmits a handover request in response to the determination. For example, the base station 102, 180, 310, 402, 1002 transmits a handover request in response to the determination (FIG. 10, step 3; FIG. 14, step 3).

At 1614, the base station receives a handover request acknowledge. For example, the base station 102, 180, 310, 402, 1002 receives a handover request acknowledge (FIG. 10, step 5; FIG. 14, step 5).

At 1616, the base station transmits an RRC connection reconfiguration based on the handover request acknowledge. For example, the base station 102, 180, 310, 402, 1002 transmits an RRC connection reconfiguration based on the handover request acknowledge (FIG. 10, step 6; FIG. 14, step 6).

Figure 17:
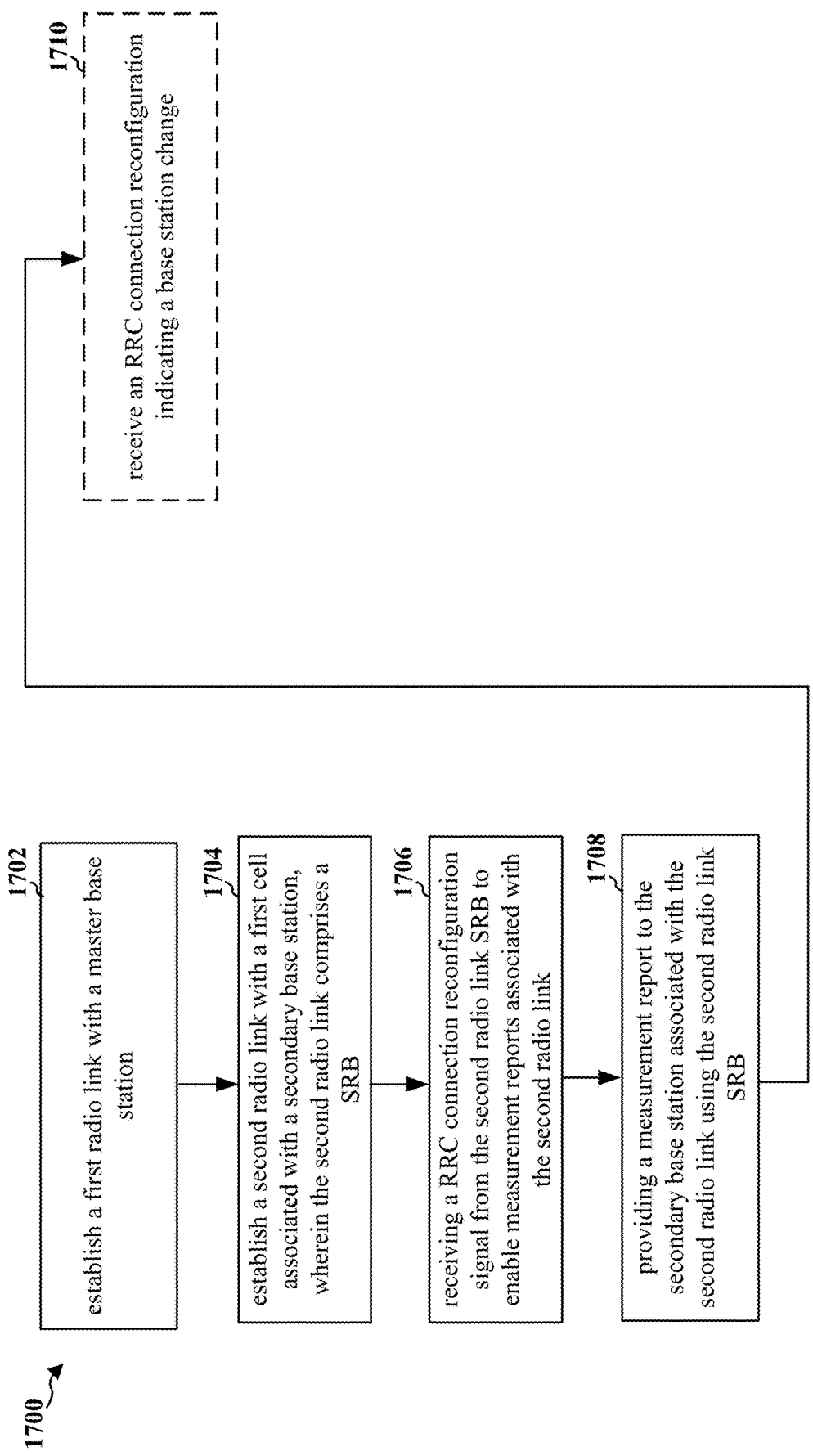
FIG. 17 is a flowchart of a method of wireless communication.

FIG. 17 is a flowchart 1700 of a method of wireless communication. The method may be performed by a UE (e.g., the UE 104, 350, 404, 506). At 1702, the UE establishes a first radio link with a master base station. For example, the UE 104, 350, 404, 506 establishes a first radio link with a master base station 102, 180, 310, 402, 502, 504 (FIG. 10, step 0; FIG. 14, step 0).

At 1704, the UE establishes a second radio link with a first cell associated with a secondary base station. The second radio link including a SRB. For example, the UE 104, 350, 404, 506 establishes a second radio link with a first cell associated with a secondary base station 102, 180, 310, 402, 502, 504. The second radio link including a SRB (FIG. 10, step 0; FIG. 14, step 0).

At 1706, the UE receives a RRC connection reconfiguration signal from the second radio link SRB to enable measurement reports associated with the second radio link. For example, the UE 104, 350, 404, 506 receives a RRC connection reconfiguration signal from the second radio link SRB (1002) to enable measurement reports associated with the second radio link (FIG. 10, step 1; FIG. 14, step 1).

In an aspect, the RRC connection reconfiguration is received from the secondary base station using the second radio link SRB. In an aspect, the RRC connection reconfiguration is received from a master base station using the first radio link SRB. The RRC connection reconfiguration may be included in a transparent container. In an aspect, the RRC connection reconfiguration is received from a master base station either via the first radio link or via the second radio link. In an aspect, the RRC connection reconfiguration signal from the second radio link SRB is received to enable measurement reports associated with the second radio link.

At 1708, the UE provides a measurement report to the secondary base station associated with the second radio link using the second radio link SRB. For example, the UE 104, 350, 404, 506 provides a measurement report to the secondary base station associated with the second radio link using the second radio link SRB (FIG. 10, step 1b; FIG. 14, step 1b).

In an aspect, providing a measurement report to the secondary base station from the UE provides the measurement report to a secondary base station associated with the second radio link using the second radio link SRB.

At 1710, the UE receives an RRC connection reconfiguration indicating a base station change. For example, the UE 104, 350, 404, 506 receives an RRC connection reconfiguration indicating a base station change (FIG. 10, step 6; FIG. 14, step 6).

Figure 18:
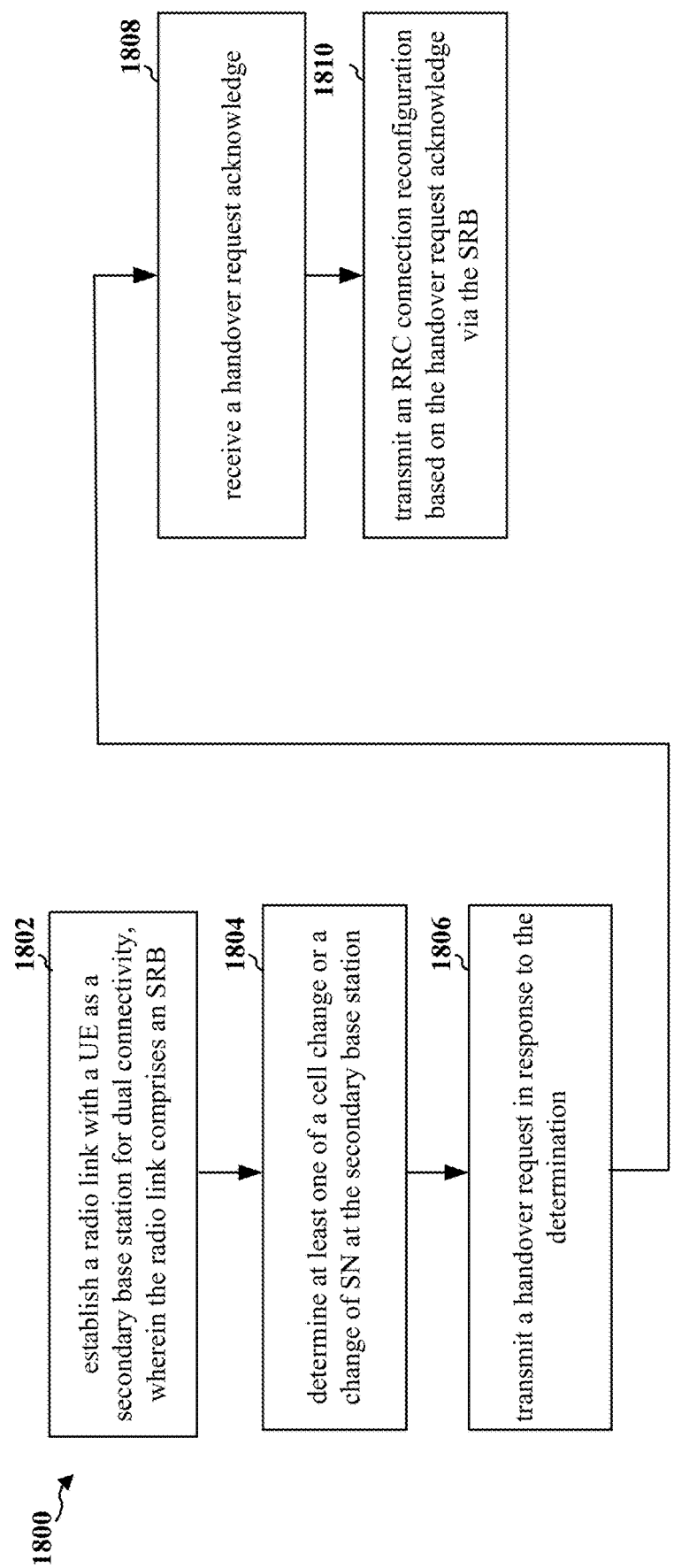
FIG. 18 is a flowchart of a method of wireless communication.

FIG. 18 is a flowchart 1800 of a method of wireless communication. The method may be performed by a base station (e.g., the base station 102, 180, 310, 402, 502, 504). The base station may be a secondary base station 1002, 1004 (S-NB, SNB1, S-NB2). At 1802, the base station establishes a radio link with a UE as a secondary base station for dual connectivity. The radio link may include a SRB. For example, the base station 102, 180, 310, 402, 1002 establishes a radio link with a UE 506 as a secondary base station for dual connectivity (FIG. 10, step 0; FIG. 14, step 0).

At 1804, the base station determines at least one of a cell change or a change of SN at the secondary base station. For example, the base station 102, 180, 310, 402, 1002 determines at least one of a cell change or a change of SN at the secondary base station (FIG. 10, step 2; FIG. 14, step 2).

At 1806, the base station transmits a handover request in response to the determination. For example, the base station 102, 180, 310, 402, 1002 transmits a handover request in response to the determination (FIG. 10, step 3; FIG. 14, step 3).

At 1808, the base station receives a handover request acknowledge. For example, the base station 102, 180, 310, 402, 1002 receives a handover request acknowledge (FIG. 10, step 5; FIG. 14, step 5).

At 1810, the base station transmits a RRC connection reconfiguration based on the handover request acknowledge via the SRB. For example, the base station 102, 180, 310, 402, 1002 transmits a RRC connection reconfiguration based on the handover request acknowledge via the SRB (FIG. 10, step 6; FIG. 14, step 6). In an aspect, the RRC connection reconfiguration may be transmitted to the UE 506 from the secondary base station 1002 (FIG. 10, step 6). In an aspect, the RRC connection reconfiguration may be transmitted to the UE 506 from the secondary base station 1002 via the master base station 502 (M-NB) (FIG. 14, step 6).

Figure 19:
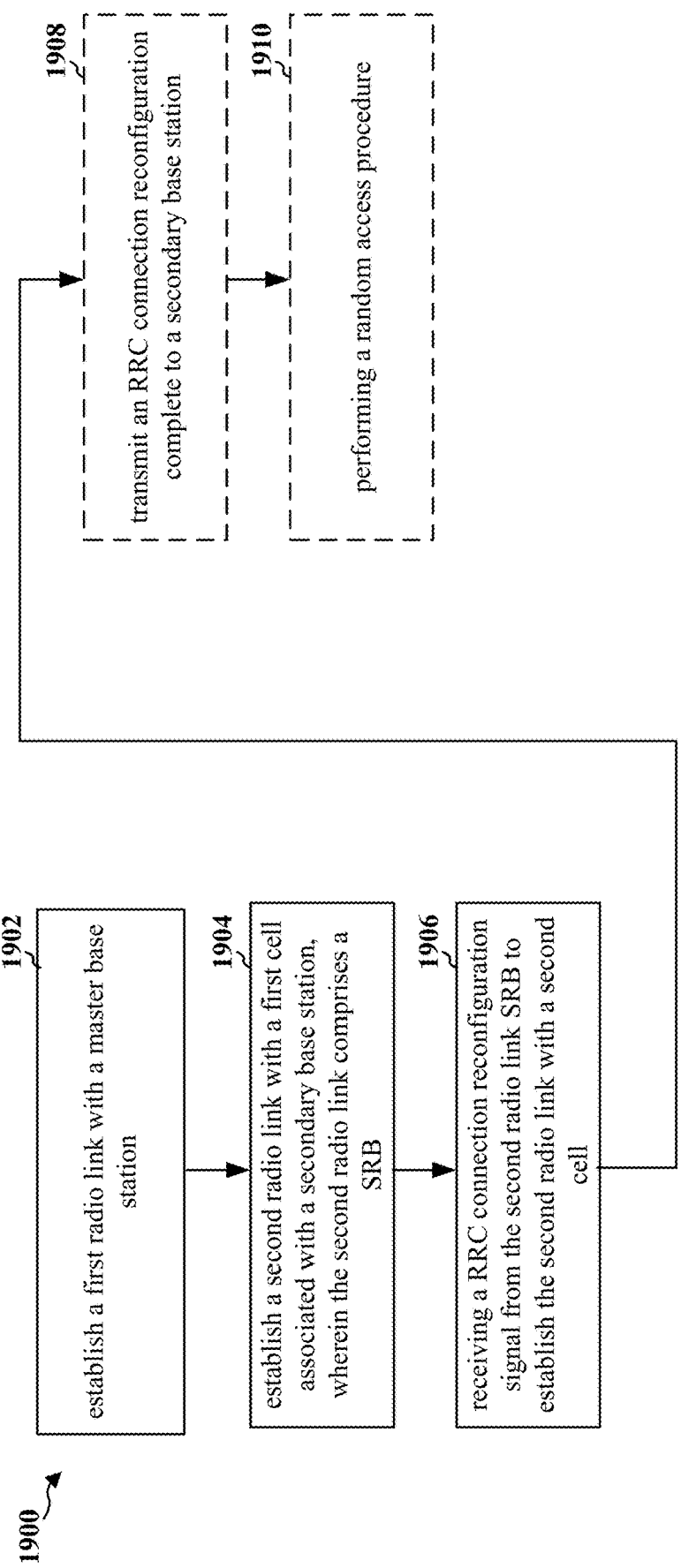
FIG. 19 is a flowchart of a method of wireless communication.

FIG. 19 is a flowchart 1900 of a method of wireless communication. The method may be performed by a UE (e.g., the UE 104, 350, 404, 506). At 1902, the UE establishes a first radio link with a master base station. For example, the UE 104, 350, 404, 506 establishes a first radio link with a master base station 102, 180, 310, 402, 502 (FIG. 10, step 0; FIG. 14, step 0).

At 1904, the UE establishes a second radio link with a first cell associated with a secondary base station. The second radio link may include a SRB. For example, the UE 104, 350, 404, 506 establishes a second radio link with a first cell associated with a secondary base station 102, 180, 310, 402, 1002, 1004 (FIG. 10, step 0; FIG. 14, step 0).

At 1906, the UE receives a RRC connection reconfiguration signal from the second radio link SRB to establish the second radio link with a second cell. For example, the UE 104, 350, 404, 506 receives a RRC connection reconfiguration signal from the second radio link SRB to establish the second radio link with a second cell (FIG. 10, step 1; FIG. 14, step 1).

In an aspect, the RRC connection reconfiguration is transmitted to a master base station 102, 180, 310, 402, 502, 504 and then the RRC connection reconfiguration is transmitted to the UE 104, 350, 404, 506 via one of the first radio link or the second radio link. In an aspect, the RRC connection reconfiguration is received from another secondary base station 102, 180, 310, 402, 502, 504. In an aspect, the RRC connection reconfiguration is received from a master base station 502.

At 1908, the UE transmits an RRC connection reconfiguration complete to a secondary base station. For example, the UE 104, 350, 404, 506 transmits an RRC connection reconfiguration complete to a secondary base station 102, 180, 310, 402, 1004 (FIG. 10, step 6b; FIG. 14, step 6b).

At 1910, the UE performs a random access procedure. For example, the UE 104, 350, 404, 506 performs a random access procedure (FIG. 10, step 6c; FIG. 14, step 6c).

Figure 20:
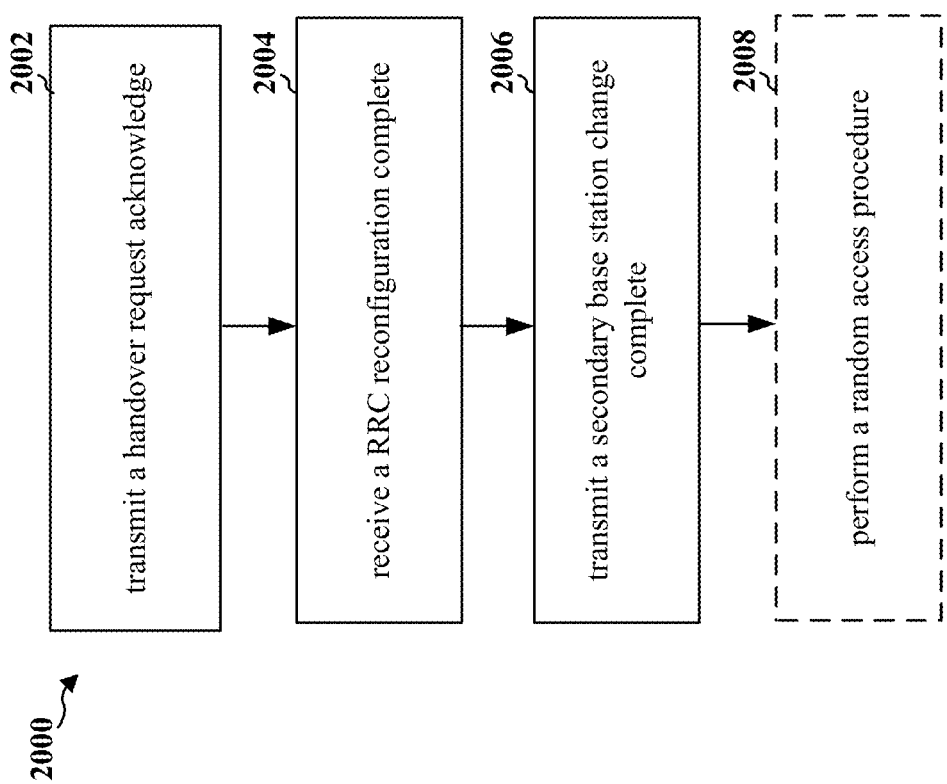
FIG. 20 is a flowchart of a method of wireless communication.

FIG. 20 is a flowchart 2000 of a method of wireless communication. The method may be performed by a base station (e.g., the base station 102, 180, 310, 402, 502, 504). The base station may be a secondary base station 1004. At 2002, the base station transmits a handover request acknowledge. For example, the base station 102, 180, 310, 402, 1004 transmits a handover request acknowledge (FIG. 10, step 5; FIG. 14, step 5).

At 2004, the base station receives a RRC reconfiguration complete. For example, the base station 102, 180, 310, 402, 1004 receives a RRC reconfiguration complete (FIG. 10, step 6b; FIG. 14, step 6b).

At 2006, the base station transmits a secondary base station change complete. For example, the base station 102, 180, 310, 402, 502, 504 transmits a secondary base station change complete (FIG. 10, step 7; FIG. 14, step 7).

At 2008, the base station performs a random access procedure. For example, the base station 102, 180, 310, 402, 502, 504 performs a random access procedure (FIG. 10, step 6c; FIG. 14, step 6c).

Figure 21:
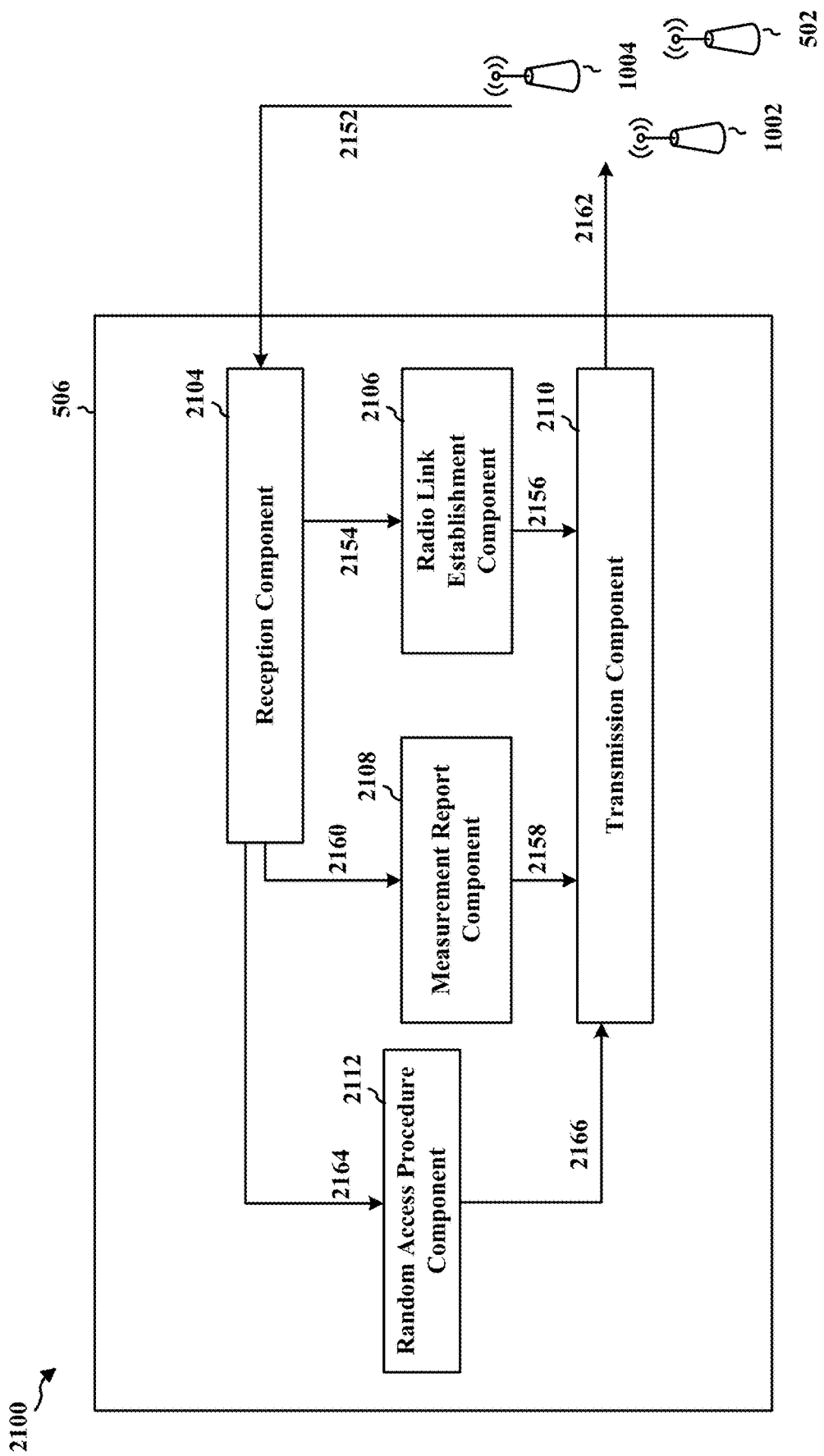
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 506'. The apparatus may be a UE. The apparatus includes a reception component 2104 that receives a RRC connection reconfiguration signal from the second radio link SRB to establish the second radio link with a second cell and/or receive an RRC connection reconfiguration indicating a base station change (2152); a radio link establishment component 2106 that establishes a first radio link with a master base station and/or establishes a second radio link with a first cell associated with a secondary base station (e.g., by controlling the reception component 2104 and/or the transmission component 2110 using control signals 2154, 2156); a measurement report component 2108 that provides a measurement report (2158) to the secondary base station associated with the second radio link using the second radio link SRB (e.g., based on signals 2160 from the reception component 2104); a transmission component 2110 that transmit an RRC connection reconfiguration complete to a secondary base station and/or transmits the measurement report from the measurement report component 2108 (2162); and a random access procedure component 2112 that performs a random access procedure (e.g., by controlling the reception component 2104 and/or the transmission component 2110 using control signals 2164, 2166).

The apparatus may include additional components that perform each of the blocks of the algorithm in the aforementioned flowcharts of FIGS. 17 and 19. As such, each block in the aforementioned flowcharts of FIGS. 17 and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
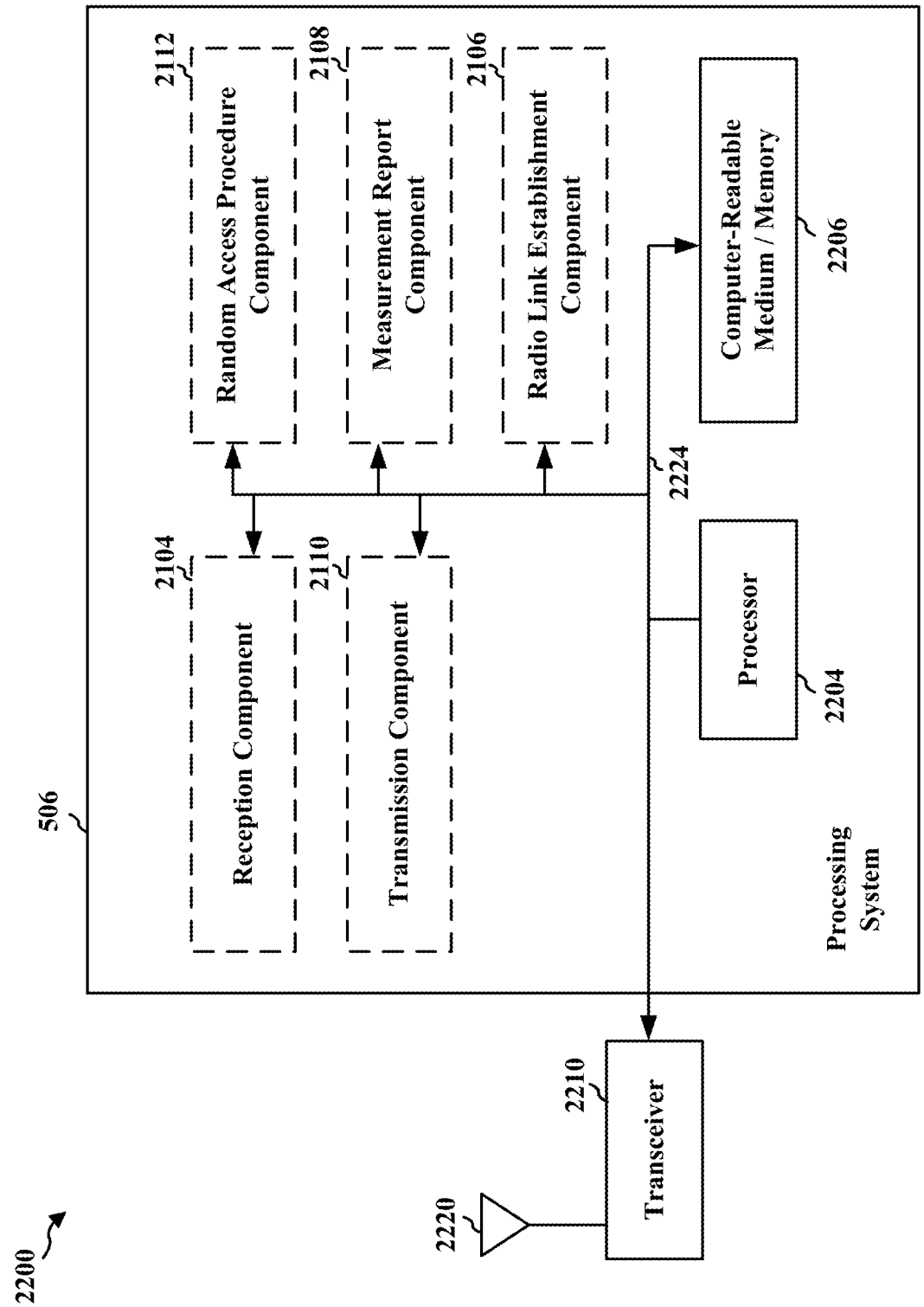
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104 that receives a RRC connection reconfiguration signal from the second radio link SRB to establish the second radio link with a second cell and/or receive an RRC connection reconfiguration indicating a base station change. In addition, the transceiver 2210 receives information from the processing system 2214, specifically the transmission component 2110 that transmit an RRC connection reconfiguration complete to a secondary base station and/or transmits the measurement report from the measurement report component 2108, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112. The components may be software components running in the processor 2204, resident/stored in the computer readable medium/memory 2206, one or more hardware components coupled to the processor 2204, or some combination thereof. The processing system 2214 may be a component of the UE 350 and may include the memory 360 and/or at least one of the TX processor 368, the RX processor 356, and the controller/processor 359.

In one configuration, the apparatus 2102/2102' for wireless communication includes means for establishing a first radio link with a master base station, means for establishing a second radio link with a first cell associated with a secondary base station, wherein the second radio link comprises a SRB, means for receiving a RRC connection reconfiguration signal from the second radio link SRB to enable measurement reports associated with the second radio link, means for providing a measurement report to the secondary base station associated with the second radio link using the second radio link SRB, means for receiving an RRC connection reconfiguration indicating a base station change, means transmitting an RRC connection reconfiguration complete to a secondary base station, and means performing a random access procedure.

The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 23:
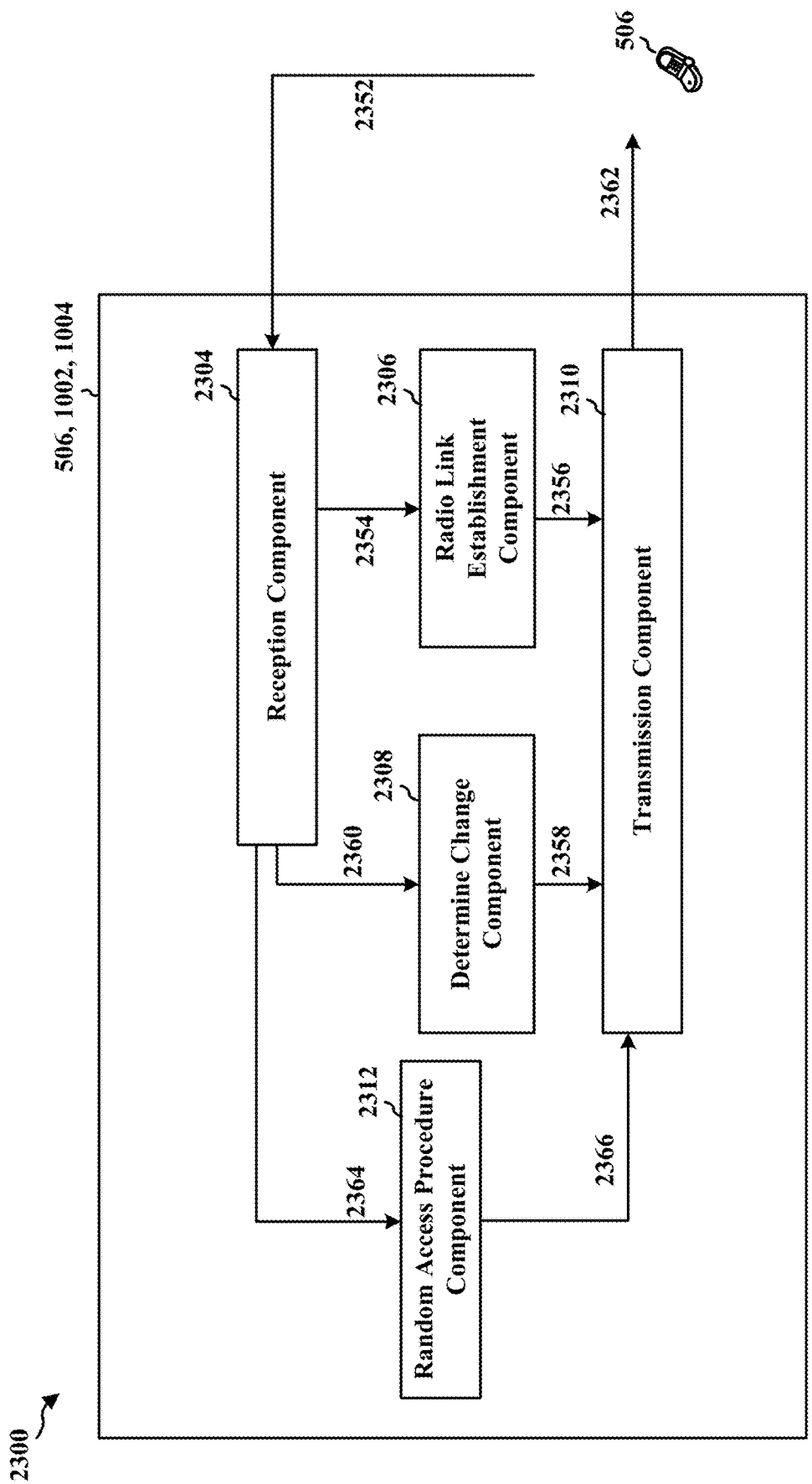
FIG. 23 is a conceptual data flow diagram illustrating the data flow between different means/components in an exemplary apparatus.

FIG. 23 is a conceptual data flow diagram 2300 illustrating the data flow between different means/components in an exemplary apparatus 2302. The apparatus may be a base station. The apparatus includes a reception component 2304 that receives an RCC connection reconfiguration complete signal at the secondary base station from the UE, receives a measurement report at the secondary base station from the UE associated with the radio link, receives a handover request acknowledge, receives a RRC reconfiguration complete; a radio link establishment component 2306 that establishes a radio link for dual connectivity to a UE, wherein the radio link comprises a SRB and/or establish a radio link with a UE as a secondary base station for dual connectivity, wherein the radio link comprises an SRB; a determine change component 2308 that determines a base station change at the secondary base station based on the measurement report, determine at least one of a cell change or a change of SN at the secondary base station; a transmission component 2310 that transmit an RRC connection reconfiguration signal to the UE to enable measurement reports associated with the radio link, transmit a handover request in response to the determination, transmit an RRC connection reconfiguration based on the handover request acknowledge, transmit an RRC connection reconfiguration based on the handover request acknowledge via the SRB, transmit a handover request acknowledge, transmit a secondary base station change complete; and a random access procedure component 2312 that performs a random access procedure.

The apparatus may include additional components that perform each of the blocks of the algorithm in the aforementioned flowcharts of FIGS. 16, 18, and 20. As such, each block in the aforementioned flowcharts of FIGS. 16, 18, and 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
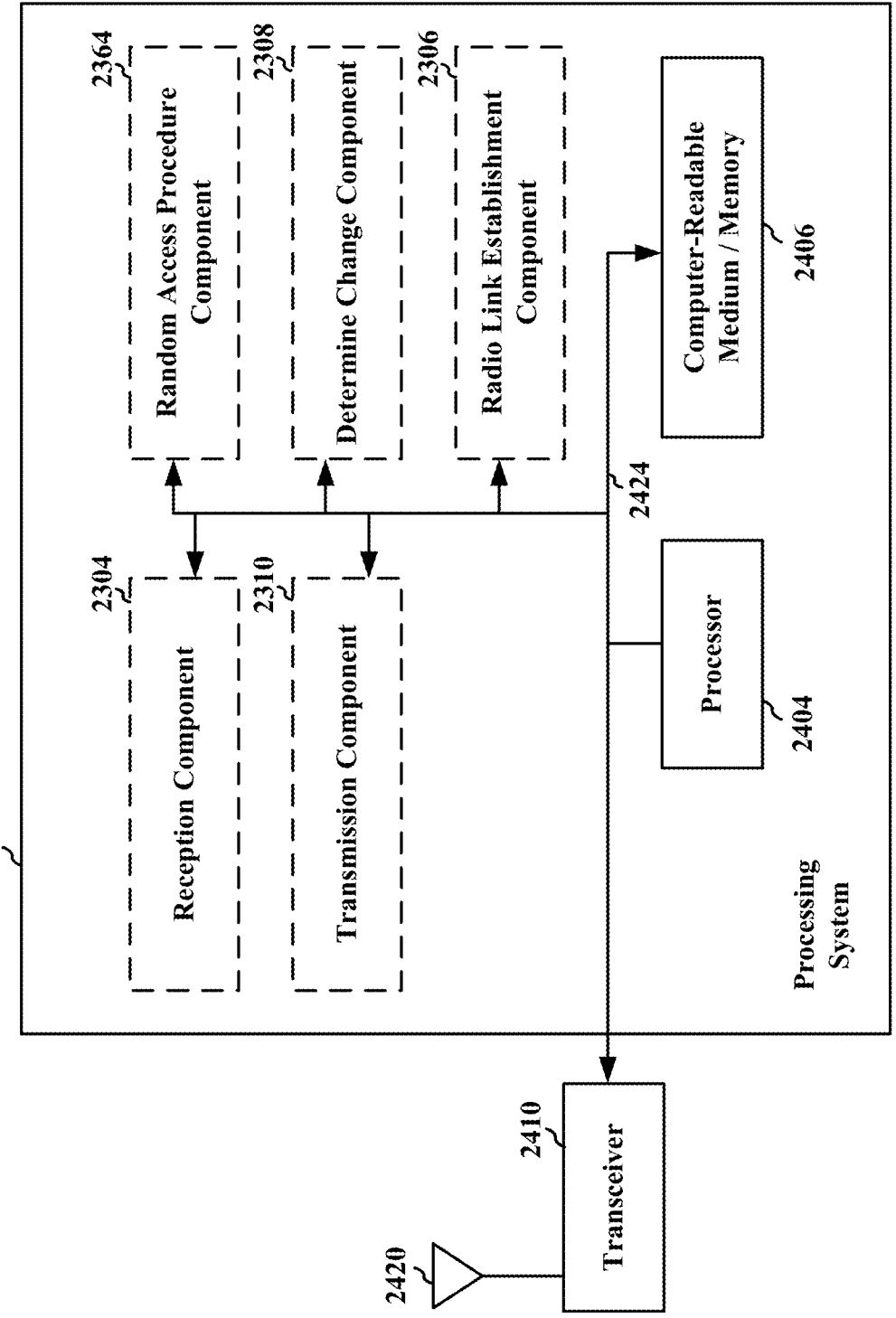
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, 2310, 2312 and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304 receives an RCC connection reconfiguration complete signal at the secondary base station from the UE, receives a measurement report at the secondary base station from the UE associated with the radio link, receives a handover request acknowledge, receive a RRC reconfiguration complete. In addition, the transceiver 2410 receives information from the processing system 2414, specifically the transmission component 2310 transmit an RRC connection reconfiguration signal to the UE to enable measurement reports associated with the radio link, transmit a handover request in response to the determination, transmit an RRC connection reconfiguration based on the handover request acknowledge, transmit an RRC connection reconfiguration based on the handover request acknowledge via the SRB, transmit a handover request acknowledge, transmit a secondary base station change complete, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system 2414 further includes at least one of the components 2304, 2306, 2308, 2310, 2312. The components may be software components running in the processor 2404, resident/stored in the computer readable medium/memory 2406, one or more hardware components coupled to the processor 2404, or some combination thereof. The processing system 2414 may be a component of the base station 310 and may include the memory 376 and/or at least one of the TX processor 316, the RX processor 370, and the controller/processor 375.

In one configuration, the apparatus 2302/2302' for wireless communication includes means for establishing a radio link for dual connectivity to a UE, wherein the radio link comprises a SRB, means for transmitting a RRC connection reconfiguration signal to the UE to enable measurement reports associated with the radio link, means for receiving an RCC connection reconfiguration complete signal at the secondary base station from the UE, means for receiving a measurement report at the secondary base station from the UE associated with the radio link, means for determining a base station change at the secondary base station based on the measurement report, means for transmitting a handover request in response to the determination, means for receiving a handover request acknowledge, means for transmitting an RRC connection reconfiguration based on the handover request acknowledge, means establishing a radio link with a UE as a secondary base station for dual connectivity, wherein the radio link comprises a SRB, means determining at least one of a cell change or a change of SN at the secondary base station, means transmitting a handover request in response to the determination, means receiving a handover request acknowledge, and means transmitting a RRC connection reconfiguration based on the handover request acknowledge via the SRB, means transmitting a handover request acknowledge, means receiving a RRC reconfiguration complete, and means transmitting a secondary base station change complete. The aforementioned means may be one or more of the aforementioned components of the apparatus 2302 and/or the processing system 2414 of the apparatus 2302' configured to perform the functions recited by the aforementioned means. As described supra, the processing system 2414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Some aspects may be related to capability coordination across RATs. RAN may addressing all usage scenarios, requirements, and deployment scenarios. Aggregation scenarios may include the following requirements for (1) the RAN architecture may support tight interworking between the new RAT and LTE and/or (2) high performing inter-RAT mobility and aggregation of data flows via at least dual connectivity between LTE and new RAT. Aggregation scenarios may be supported for both collocated and non-collocated site deployments.

An aspect may include the following cell layout scenarios, node B location for LTE-NR aggregation may be captured in the TR. LTE and NR "cells" may be overlaid and co-located providing nearly the same coverage; both are macro or small cells. LTE and NR cells may be overlaid, and co-located, or not co-located providing different coverage; one is a macro cell and the other is a small cell.

In an aspect, the following scenarios in terms of CN connection for LTE-NR aggregation may be captured in the TR. NR may tightly integrated in LTE via EPC (U-plane data is split at CN or RAN). LTE may tightly integrated in NR via New CN (U-plane data is split at CN or RAN). NR may be tightly integrated in LTE via new CN (U-plane data is split at CN or RAN). In an aspect, the following scenarios in terms of cell layout for standalone NR are captured into the TR including (1) macro cell only deployment, (2) heterogeneous deployment, and/or (3) small cell only deployment.

In another aspect, the following scenarios in terms of CN connection for single RAT and inter-RAT standalone operation may captured in the TR. For single RAT operation, (1) NR Node B is connected to New CN, (2) LTE eNB is connected to NR Node BNew CN (or EPC as today). For inter-RAT mobility: (1) LTE eNB is connected to EPC and NR Node B is connected to New CN, and/or (2) both LTE eNB and NR Node B are connected to New CN.

Aspects include scenarios of NR with 4G/Wifi, with regard to the UE capabilities and the resulting correlation of the RRC ASN.1 and procedures. In UMTS and LTE network deployments, the UE capabilities sizes have had a recurring problem. In 3G, the capability was sent at every RRC connection. This scheme indirectly offered the UE some flexibility in terms of being able to change its capabilities with time; however, it consumed system resources. This scheme worked well initially when the capabilities were small. Then, the UMTS capability started carrying the LTE capabilities including all the carrier combinations. That's when call setups started to fail, especially in bad radio conditions, as the transmission of the capabilities were taking so long that the network would timeout and release the RRC connection [Add References to QC papers].

For 4G, 3GPP decided for a number of reasons not to send the capabilities at every RRC connection. Instead, the network saves the UE capabilities and move them around following the UE mobility, avoiding the repeated transmission over the air. Saving the UE capabilities and moving the UE capabilities around following the UE mobility was supposed to work as well when the UE moves from UMTS to LTE. However, saving the UE capabilities and moving the UE capabilities around following the UE mobility may have two problems. First, by design, the process removes the ability of the UE to adapt the UE's capabilities over time. Second, a system may be impacted by different size limits as the number of band combinations grows. 3GPP addressed the limited number of band combinations in the ASN.1 that can be reported by: (1) allowing the network to provide a list of bands used in this network and allowing the network to advertise the maximum number of carriers that are combined in this network, (2) allowing the UE to skip intermediate band combinations, and (3) adding a new container of band combinations NR may have the following problems with regard to the UE capabilities, increasing in the number of supported combinations and Inter-RAT communication. With an increased integration of air interfaces, future UEs will support more LTE band combinations, then NR+4G band combinations and NR+Wifi band combinations. Additionally, features such as MIMO, NAICS, Dual Connectivity, uplink carrier aggregation, number of CSI processes, etc., the number of combinations keeps on growing. Combining different air interface carrier combinations will also create more combinations, and the size of the capabilities that a UE needs to communicate will keep increasing in combinatory manner.

With inter-RAT communication, there may be a need for the UE to update the UE's capabilities. While the LTE standard allows the UE to update the UE's capabilities in case of GERAN or UMTS changes, the standard also forbids the UE from making any changes to the UE's LTE capabilities.

The management of UE capabilities, whether in LTE, NR, and potentially in Wifi may become a problem. Not all combinations are useful. For example, Wifi may be out of coverage, it may be impossible/improbable to coordinate with Wi-Fi, especially the large legacy deployments, or network limited capabilities, or load limited.

Some aspects NR with 4G/Wifi may be limiting. Offloading traffic may require full capabilities on the required system, whether a small cell, or Wi-Fi. (Avoid reserving resources per RAT). Multiple slices may be more active at different times.

Some aspects may have the following options for the UE capability coordination, First, a UE reports all RAT capabilities to one RAT and NW coordinates the configuration between the RATs not to exceed the UE capability. NBs may have (semi)static partitions between RATs or dynamically coordinate the configuration for the UE cap. Observation: not scalable as discussed in 3. Couples updates of LTE and NR for the foreseeable future. Second, a UE may report a capability per RAT (LTE and NR independent UE capability).

UE may partition semi-statically the UE cap or dynamically update UE cap per RAT e.g. when the other link is modified. In some cases, conditions, may not be known by the network. (Local screen mirroring over Wi-Fi.)

In an aspect, the UE may report a capability per RAT. In an aspect, the UE may not report the UE's NR capabilities to the LTE network, nor send the UE's LTE capabilities to the NR network. In an aspect, NR may adopt dynamic capability negotiation.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of a secondary base station comprising:
    establishing a radio link with a UE as a secondary base station for dual connectivity, wherein the radio link comprises a split signaling radio bearer (split SRB);
    determining at least one of a cell change or a change of sequence number (SN) at the secondary base station;
    transmitting a handover request in response to the determination;
    receiving a handover request acknowledge;
    forwarding any data for the UE to a target base station based on the handover request acknowledge, wherein the secondary base station refrains from transmitting the data to the UE on the established radio link based on the handover request acknowledge; and
    transmitting a radio resource control (RRC) connection reconfiguration based on the handover request acknowledge via the split SRB to a master base station.

2. The method of claim 1, wherein the RRC connection reconfiguration is transmitted to the UE from the secondary base station.

3. A method of a user equipment (UE) comprising:
    establishing a first radio link with a master base station;
    establishing a second radio link with a first cell associated with a secondary base station, wherein the second radio link comprises a split signaling radio bearer (split SRB);
    receiving a radio resource control (RRC) connection reconfiguration signal from the secondary base station on the second radio link split SRB to establish the second radio link with a second cell associated with a target base station; and
    transmitting an RRC connection reconfiguration completion signal based on the RRC connection reconfiguration signal, wherein the RRC connection reconfiguration completion signal is transmitted via an SRB that is determined based on at least one of the split SRB, information received by the UE that configures the SRB, a quality of the first radio link, or a quality of the second radio link.

4. The method of claim 3, wherein the RRC connection reconfiguration signal is transmitted to a master base station and then the RRC connection reconfiguration signal is transmitted to the UE via one of the first radio link or the second radio link.

5. A method of claim 4, further comprising:
    performing a random access procedure.

6. The method of claim 4, wherein the RRC connection reconfiguration is received from another secondary base station.

7. The method of claim 4, wherein the RRC connection reconfiguration is received from a master base station.

8. A method of a secondary base station comprising:
    transmitting a change request via a split signaling radio bearer (split SRB) to a master base station;
    receiving a change request acknowledge from the master base station;
    transmitting a handover request acknowledge associated with a user equipment (UE) to a source base station;
    receiving forwarded data for the UE from the source base station based on the handover request acknowledge, wherein the forwarded data is transmitted to the UE after a radio link is established with the UE;
    receiving a radio resource control (RRC) reconfiguration complete; and
    transmitting a secondary base station change complete.

9. The method of claim 8, further comprising performing a random access procedure.

10. An apparatus of a secondary base station comprising:
    means for establishing a radio link with a UE as a secondary base station for dual connectivity, wherein the radio link comprises a split signaling radio bearer (split SRB);
    means for determining at least one of a cell change or a change of sequence number (SN) at the secondary base station;
    means for transmitting a handover request in response to the determination;
    means for receiving a handover request acknowledge;
    means for forwarding any data for the UE to a target base station based on the handover request acknowledge, wherein the apparatus refrains from transmitting the data to the UE on the established radio link based on the handover request acknowledge; and
    means for transmitting a radio resource control (RRC) connection reconfiguration based on the handover request acknowledge via the split SRB to a master base station.

11. The apparatus of claim 10, wherein the RRC connection reconfiguration is transmitted to the UE from the secondary base station.

12. An apparatus of a user equipment (UE) comprising:
    means for establishing a first radio link with a master base station;

means for establishing a second radio link with a first cell associated with a secondary base station, wherein the second radio link comprises a split signaling radio bearer (split SRB);

means for receiving a radio resource control (RRC) connection reconfiguration signal from the second radio link split SRB to establish the second radio link with a second cell; and means for transmitting an RRC connection reconfiguration completion signal based on the RRC connection reconfiguration signal, wherein the RRC connection reconfiguration completion signal is transmitted via an SRB that is determined based on at least one of the split SRB, information received by the UE that configures the SRB, a quality of the first radio link, or a quality of the second radio link.

13. The apparatus of claim 12, wherein the RRC connection reconfiguration is transmitted to a master base station and then the RRC connection reconfiguration is transmitted to the UE via one of the first radio link or the second radio link.

14. The apparatus of claim 13, further comprising:
means for performing a random access procedure.

15. The apparatus of claim 13, wherein the RRC connection reconfiguration is received from another secondary base station.

16. The apparatus of claim 13, wherein the RRC connection reconfiguration is received from a master base station.

17. An apparatus of a secondary base station comprising:
means for transmitting a change request via a split signaling radio bearer (split SRB) to a master base station;
means for receiving a change request acknowledge from the base station;
means for transmitting a handover request acknowledge associated with a user equipment (UE) to a source base station;
means for receiving forwarded data for the UE from the source base station based on the handover request acknowledge, wherein the forwarded data is transmitted to the UE after a radio link is established with the UE;
means for receiving a radio resource control (RRC) reconfiguration complete; and
means for transmitting a secondary base station change complete.

18. The apparatus of claim 17, further comprising performing a random access procedure.

19. An apparatus of a secondary base station comprising:
a processing system configured to:
establish a radio link with a UE as a secondary base station for dual connectivity, wherein the radio link comprises a split signaling radio bearer (split SRB);
determine at least one of a cell change or a change of sequence number (SN) at the secondary base station;
transmit a handover request in response to the determination;
receive a handover request acknowledge;
forward any data for the UE to a target base station based on the handover request acknowledge, wherein the apparatus refrains from transmitting the data to the UE on the established radio link based on the handover request acknowledge; and
transmit a radio resource control (RRC) connection reconfiguration based on the handover request acknowledge via the split SRB to a master base station.

20. The apparatus of claim 19, wherein the RRC connection reconfiguration is transmitted to the UE from the secondary base station.

21. An apparatus of a user equipment (UE) comprising:
a processing system configured to:
establish a first radio link with a master base station;
establish a second radio link with a first cell associated with a secondary base station, wherein the second radio link comprises a split signaling radio bearer (split SRB);
receive a radio resource control (RRC) connection reconfiguration signal from the second radio link split SRB to establish the second radio link with a second cell; and
transmit an RRC connection reconfiguration completion signal based on the RRC connection reconfiguration signal, wherein the RRC connection reconfiguration completion signal is transmitted via an SRB that is determined based on at least one of the split SRB, information received by the UE that configures the SRB, a quality of the first radio link, or a quality of the second radio link.

22. The apparatus of claim 21, wherein the RRC connection reconfiguration is transmitted to a master base station and then the RRC connection reconfiguration is transmitted to the UE via one of the first radio link or the second radio link.

23. A apparatus of claim 22, wherein the processing system is further configured to:
perform a random access procedure.

24. The apparatus of claim 22, wherein the RRC connection reconfiguration is received from another secondary base station.

25. The apparatus of claim 22, wherein the RRC connection reconfiguration is received from a master base station.

26. An apparatus of a secondary base station comprising:
a processing system configured to:
transmit a change request via a split signaling radio bearer (split SRB) to a master base station;
receive a change request acknowledge from the base station;
transmit a handover request acknowledge associated with a user equipment (UE) to a source base station;
receive forwarded data for the UE from the source base station based on the handover request acknowledge, wherein the forwarded data is transmitted to the UE after a radio link is established with the UE;
receive a radio resource control (RRC) reconfiguration complete; and
transmit a secondary base station change complete.

27. The apparatus of claim 26, the processing system further configured to perform a random access procedure.

28. A non-transitory, computer-readable medium storing computer-executable code for wireless communication by a base station, comprising code to:
establish a radio link with a UE as a secondary base station for dual connectivity, wherein the radio link comprises a split signaling radio bearer (split SRB);
determine at least one of a cell change or a change of sequence number (SN) at the secondary base station;
transmit a handover request in response to the determination;
receive a handover request acknowledge;
forward any data for the UE to a target base station based on the handover request acknowledge, wherein the apparatus refrains from transmitting the data to the UE on the established radio link based on the handover request acknowledge; and transmit a radio resource control (RRC) connection reconfiguration based on the handover request acknowledge via the split SRB to a master base station.

29. A non-transitory computer-readable medium storing computer-executable code for wireless communication by a base station, comprising code to:

establish a first radio link with a master base station;

establish a second radio link with a first cell associated with a secondary base station, wherein the second radio link comprises a split signaling radio bearer (split SRB);

receive a radio resource control (RRC) connection reconfiguration signal from the second radio link split SRB to establish the second radio link with a second cell; and transmit an RRC connection reconfiguration completion signal based on the RRC connection reconfiguration signal, wherein the RRC connection reconfiguration completion signal is transmitted via an SRB that is determined based on at least one of the split SRB, information received by the UE that configures the SRB, a quality of the first radio link, or a quality of the second radio link.

30. A non-transitory computer-readable medium computer-executable code for wireless communication by a base station, comprising code to:

transmit a change request via a split signaling radio bearer (split SRB) to a master base station;

receive a change request acknowledge from the base station;

transmit a handover request acknowledge associated with a user equipment (UE) to a source base station;

receive forwarded data for the UE from the source base station based on the handover request acknowledge, wherein the forwarded data is transmitted to the UE after a radio link is established with the UE;

receive a radio resource control (RRC) reconfiguration complete; and transmit a secondary base station change complete.

* * * * *